United States Patent
Kao et al.

(10) Patent No.: US 12,254,137 B2
(45) Date of Patent: Mar. 18, 2025

(54) ELECTRONIC APPARATUS WITH HAPTIC OUTPUT AND METHOD FOR CONTROLLING HAPTIC OUTPUT

(71) Applicant: Wistron Corporation, New Taipei (TW)

(72) Inventors: Yi-Sheng Kao, New Taipei (TW); Chia-Chang Hou, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 0 days.

(21) Appl. No.: 18/357,243

(22) Filed: Jul. 24, 2023

(65) Prior Publication Data

US 2024/0329741 A1     Oct. 3, 2024

(30) Foreign Application Priority Data

Mar. 28, 2023   (TW) .................................. 112111843

(51) Int. Cl.
*G06F 3/01* (2006.01)
*G06F 3/04883* (2022.01)
*H04N 23/61* (2023.01)

(52) U.S. Cl.
CPC .......... *G06F 3/016* (2013.01); *G06F 3/04883* (2013.01); *H04N 23/61* (2023.01); *G06F 2203/04808* (2013.01)

(58) Field of Classification Search
CPC ................. G06F 3/016; G06F 3/04883; G06F 2203/04808; H04N 23/61
See application file for complete search history.

(56) References Cited

U.S. PATENT DOCUMENTS

| | | | |
|---|---|---|---|
| 8,884,927 B1* | 11/2014 | Cheatham, III | G06F 3/0436 178/19.02 |
| 2013/0093732 A1 | 4/2013 | Esteve et al. | |
| 2015/0175172 A1* | 6/2015 | Truong | G10L 25/48 701/36 |
| 2021/0173509 A1* | 6/2021 | Tanaka | G06F 3/0416 |
| 2022/0016673 A1* | 1/2022 | Lee | G06F 3/011 |

OTHER PUBLICATIONS

Examination report dated Feb. 6, 2024, listed in related Taiwan patent application No. 112111843.

* cited by examiner

*Primary Examiner* — Robin J Mishler
*Assistant Examiner* — Cory A Almeida
(74) *Attorney, Agent, or Firm* — McClure, Qualey & Rodack, LLP

(57) ABSTRACT

An electronic apparatus with haptic output includes a camera component, a processing unit and an ultrasonic component. The processing unit is coupled to the camera component and the ultrasonic component, wherein the processing unit is configured to: receive a detection image through the camera component, analyze the detection image to obtain an operating position, generate a first control signal corresponding to the operating position, and output the first control signal to the ultrasonic component and generate a plurality of first oscillating points forming an oscillating clump at the operating position based on the first control signal through the ultrasonic component.

18 Claims, 17 Drawing Sheets

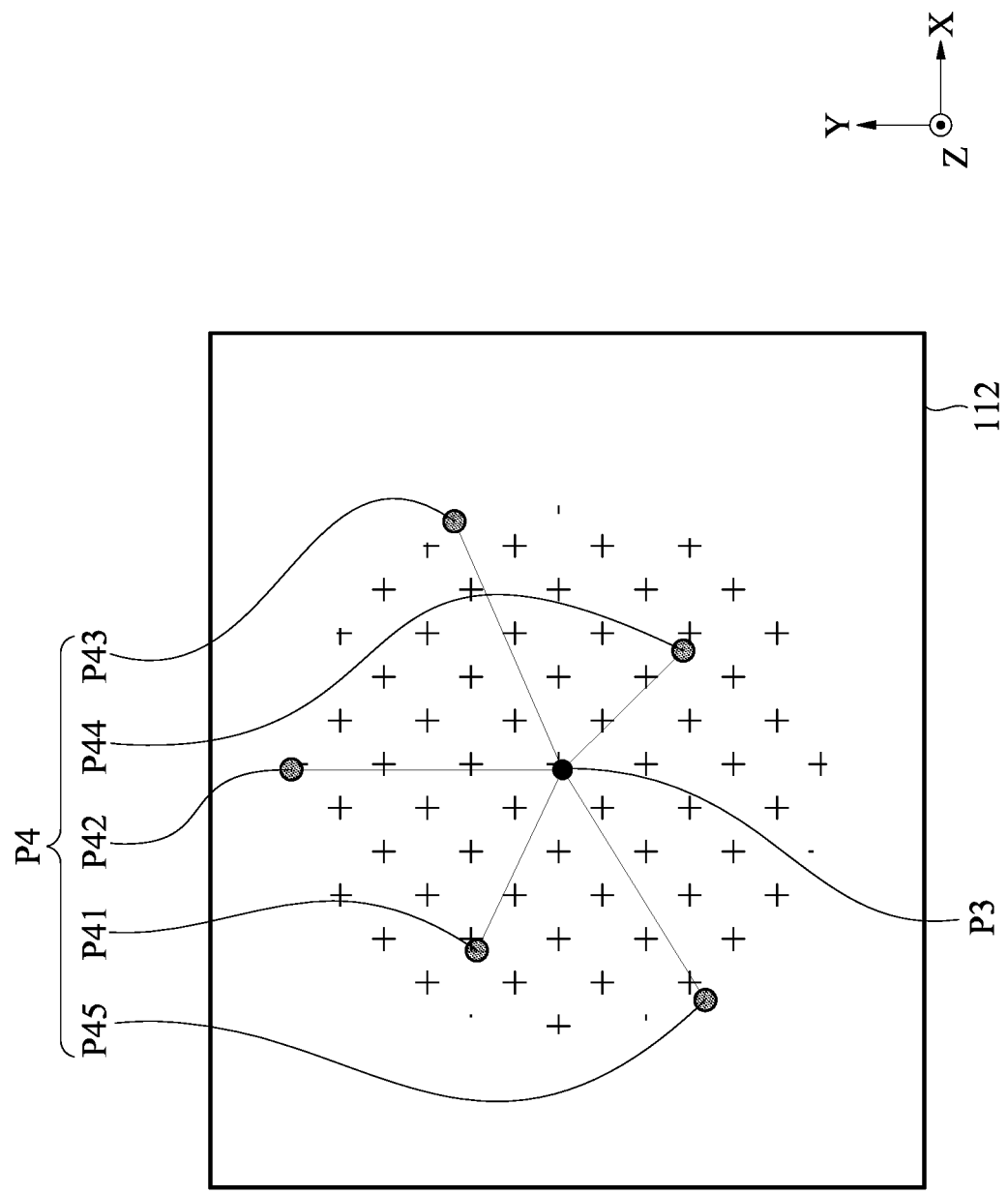

ELECTRONIC APPARATUS WITH HAPTIC OUTPUT AND METHOD FOR CONTROLLING HAPTIC OUTPUT

CROSS-REFERENCE TO RELATED APPLICATION

This non-provisional application claims priority under 35 U.S.C. § 119(a) to patent application Ser. No. 11/211,1843 filed in Taiwan, R.O.C. on Mar. 28, 2023, the entire contents of which are hereby incorporated by reference.

BACKGROUND

Technical Field

The present invention relates to a user interface with haptic output, and in particular relates to an electronic apparatus with haptic output and a method for controlling haptic output.

Related Art

Most conventional electronic apparatuses use physical keys as a user interface for a user to operate. However, the more functions the electronic apparatus provides, the more the number of the physical keys must also increase relatively. As such, the difficulty of designing an operating interface of the electronic apparatus will be increased, and the physical keys are prone to malfunction and/or are damaged due to frequent use.

Nowadays, electronic apparatuses have increasingly adopted digital user interfaces to enhance the overall user experience. These interfaces utilize software to display virtual keys on touch panels, enabling users to interact with the device in a more intuitive and humanistic manner. As a result, input operations are no longer limited to actions such as "Click" and "HotKey". Instead, they have evolved towards more advanced operations such as "multi-point manipulation" and "complex gesture-based interactions", thanks to the advancements in software technology.

SUMMARY

In some embodiments, an electronic apparatus with haptic output includes a camera component, a processing unit and an ultrasonic component. The processing unit, coupled to the camera component and the ultrasonic component, wherein the processing unit is configured to: receive a detection image through the camera component, analyze the detection image to obtain an operating position, generate a first control signal corresponding to the operating position and, output the first control signal to the ultrasonic component and generate a plurality of first oscillating points forming an oscillating clump at the operating position based on the first control signal through the ultrasonic component.

In some embodiments, a method for controlling haptic output includes: receiving, by a processing unit, a detection image through a camera component; analyzing, by the processing unit, the detection image to obtain an operating position of an interactive part; generating, by the processing unit, a first control signal based on the operating position; and generating, by an ultrasonic component, a plurality of first oscillating points forming an oscillating clump at the operating position based on the first control signal.

In some embodiments, a method for controlling haptic output includes: capturing a detection image; analyzing the detection image to obtain an operating position and an operating quantity of an interactive part; generating a first control signal based on the operating position and the operating quantity; generating a plurality of first oscillating points forming an oscillating clump at the operating position based on the first control signal; and displaying a display screen, where the oscillating clump is associated with the display screen.

In summary, in some embodiments, an electronic apparatus with haptic output and a method for controlling haptic output are applicable to a user interface of the electronic apparatus, to provide a corresponding oscillating clump by quickly scanning the operating position via the oscillating points, to serve as a virtual operating part with a real haptic sense, such as a virtual key, a virtual knob or a virtual lever, thereby making the operating experience close to that of a physical object. Moreover, based on the electronic apparatus with haptic output or the method for controlling haptic output, the energy of each oscillating point is reduced, to avoid a sharp haptic sense that may occur when touching the oscillating clump, thereby making the operating experience closer to that of the physical object. In some embodiments, based on the electronic apparatus with haptic output or the method for controlling haptic output, the size of the oscillating clump can be adjusted based on the dimension of the interactive part, thereby making a virtual manipulation interface more in line with human factors engineering. In some embodiments, based on the electronic apparatus with haptic output or the method for controlling haptic output, distribution positions, a generation order, oscillation intensity or a combination thereof of the oscillating points forming the oscillating clump can be adjusted based on a simple and intuitive operating motion (for example, fingers rotating like turning a knob, or fingers pressing down like pressing a key) of the interactive part, in order to make the virtual manipulation interface more intuitive to use, thereby eliminating the need to recite the complex operating motion.

BRIEF DESCRIPTION OF THE DRAWINGS

FIG. 7a is a schematic diagram of an example of an electronic apparatus with haptic output forming a second oscillating clump according to some embodiments.

DETAILED DESCRIPTION

Figure 1:
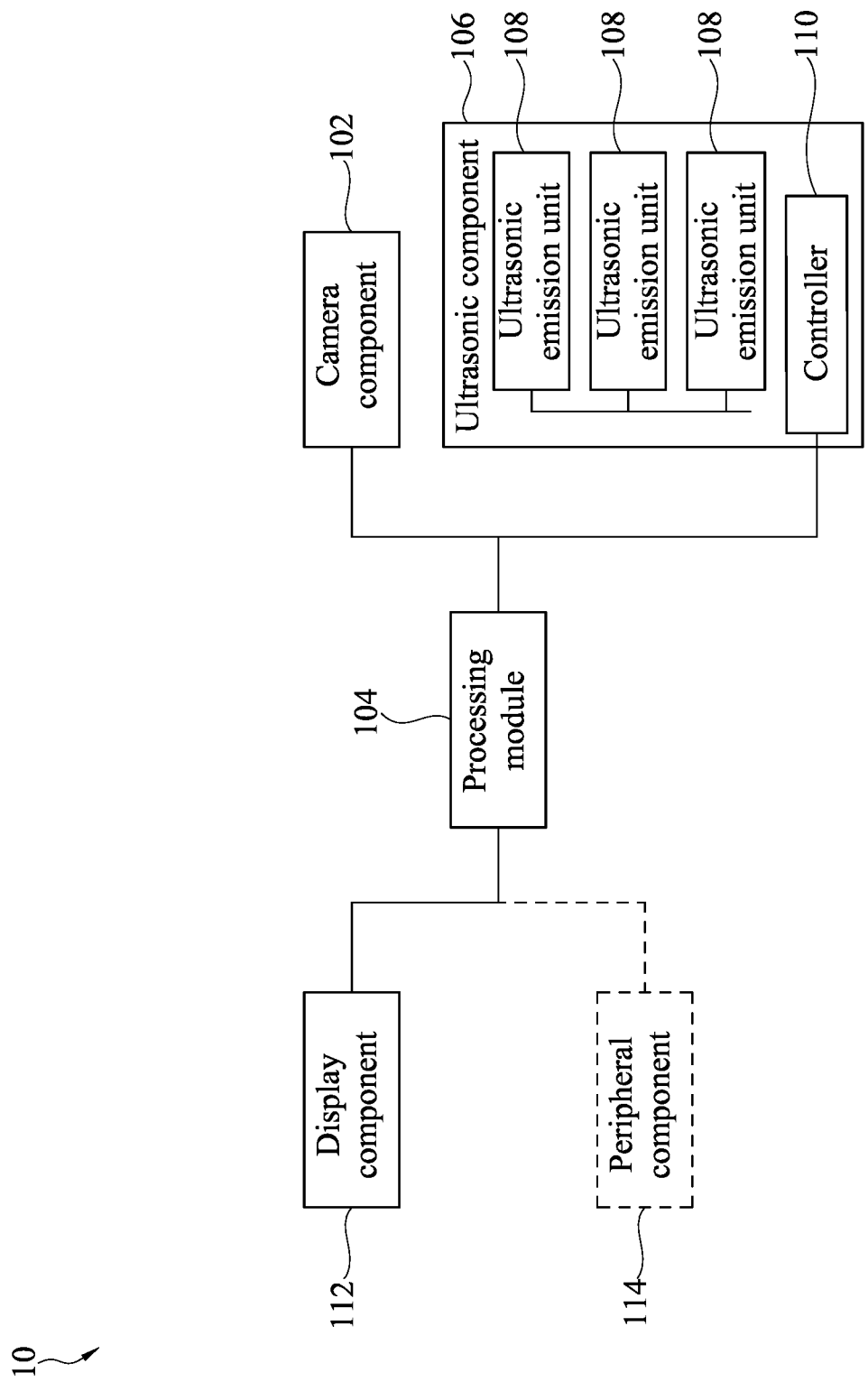
FIG. 1 is a functional block diagram of an electronic apparatus with haptic output according to some embodiments.
Figure 2:
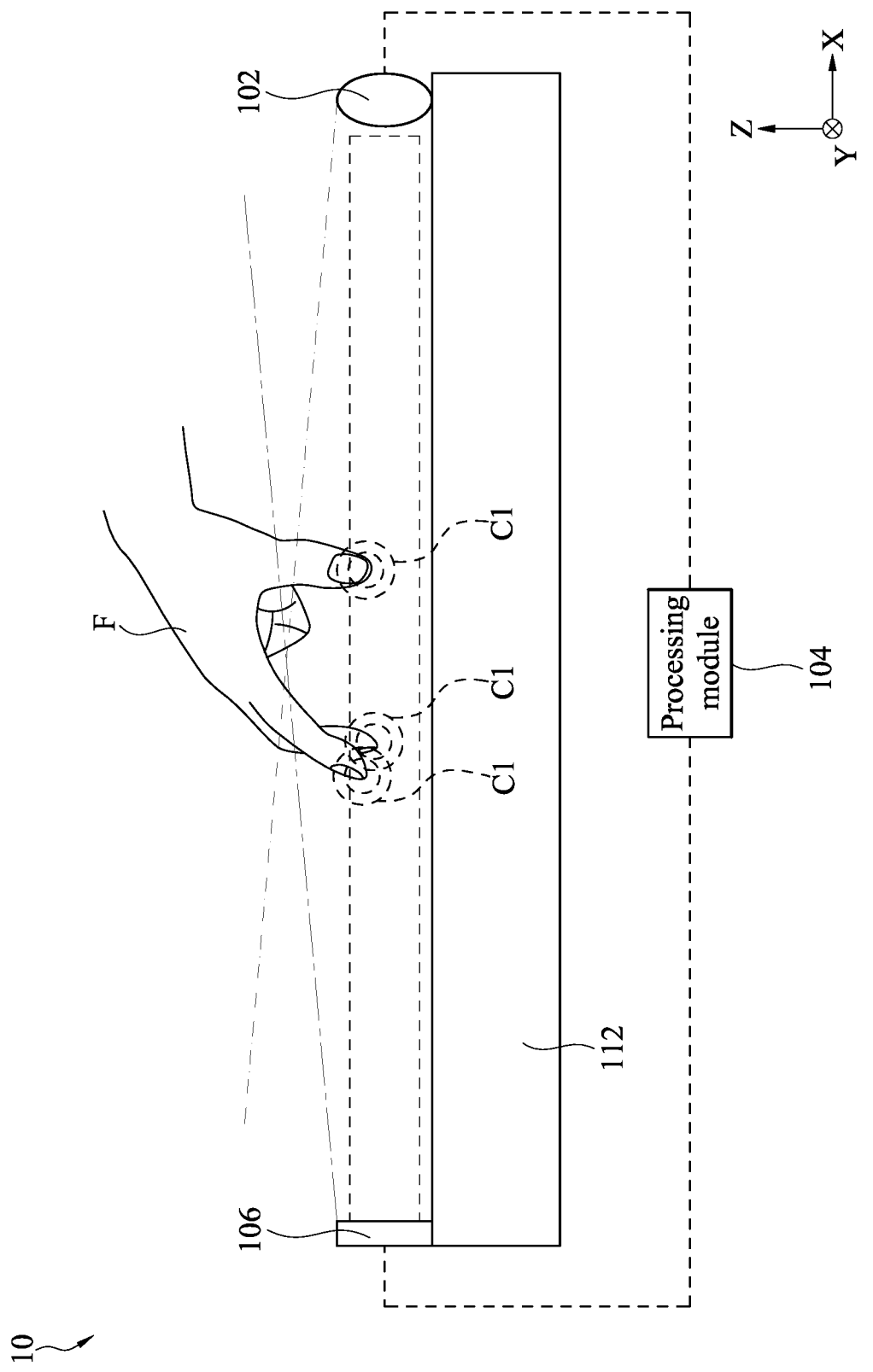
FIG. 2 is a side view of the electronic apparatus with haptic output in FIG. 1.
Figure 3A:
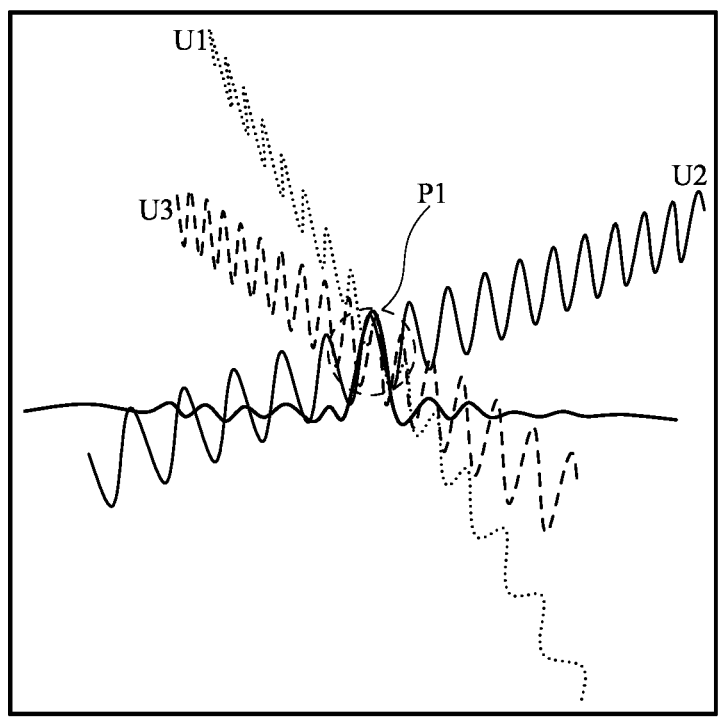
FIG. 3a is a schematic diagram of an electronic apparatus with haptic output forming first oscillating points according to some embodiments.

Referring to FIGS. 1, 2 and 3a, an electronic apparatus 10 with haptic output (hereinafter referred to as an electronic apparatus 10) includes a camera component 102, a processing unit 104 and an ultrasonic component 106. The processing unit 104 is coupled to the camera component 102 and the ultrasonic component 106.

Here, the camera component 102 is configured to capture a detection image. The processing unit 104 is configured to analyze the detection image to obtain an operating position, and generate a control signal (hereinafter referred to as a first control signal) corresponding to the operating position. The ultrasonic component 106 is coupled to sequentially generate a plurality of oscillating points (hereinafter referred to as first oscillating points P1) forming an oscillating clump (hereinafter referred to as a first oscillating clump C1) at the operating position based on the first control signal. Specifically, these first oscillating points P1 have different and continuous generation time, and time-varying generation points. In other words, these first oscillating points P1 are generated sequentially at different points at the operating position.

Here, the visual range of the camera component 102 and the operating range of the ultrasonic component 106 will form a three-dimensional space for a user to manipulate the electronic apparatus 10, and the operating position is a position where an interactive part appears in this three-dimensional space. In other words, the three-dimensional space is greater than the operating position. The detection image refers to a spatial image correspondingly generated by the camera component 102 shooting the three-dimensional space. Therefore, when the interactive part enters the three-dimensional space, the detection image generated by the camera component 102 will have a pattern of the interactive part, that is, the detection image is an image with the interactive part present in the three-dimensional space. The processing unit 104 then can obtain, by analyzing a distribution position of the pattern of the interactive part on the detection image and/or a pattern size, one or more pieces of coordinate information (and a distribution range of the pattern of the interactive part) that represents a position where the interactive part is located in the three-dimensional space, and generates a first control signal corresponding to the coordinate information (and the distribution range of the pattern of the interactive part).

In some embodiments, the interactive part may be at least one finger F of the user. The detection image captured by the camera component 102 includes an operating quantity. The operating quantity may refer to the quantity of the interactive parts, that is, the quantity of the fingers F.

In some embodiments, when the detection image may be a two-dimensional image, the operating position may be a two-dimensional coordinate that represents a position where the interactive part (for example, the central point of each finger F) is located in the three-dimensional space (such as an X-axis coordinate and a Y-axis coordinate of the central point of each finger F). In some other embodiments, the detection image may be a three-dimensional image, and the operating position may have a three-dimensional coordinate that represents a position where the interactive part is located in the three-dimensional space (for example, an X-axis coordinate, a Y-axis coordinate and a Z-axis coordinate of the central point of each finger F). By way of example, in terms of a three-dimensional coordinate system of the detection image, each pixel in the pattern of each interactive part has an X-axis coordinate, a Y-axis coordinate and a Z-axis coordinate (i.e., depth information). Therefore, the coordinate information that represents the position where the interactive part is located in the three-dimensional space may be the X-axis coordinate, the Y-axis coordinate and the Z-axis coordinate of that pixel of the central point of each finger pattern in the detection image, or an average value of the X-axis coordinates, an average value of the Y-axis coordinates and an average value of the Z-axis coordinates of all pixels of each finger pattern in the detection image. The distribution range of the pattern of the interactive part may be each axis coordinate or its difference of two pixels, with a line therebetween passing through the central point and farthest apart, of the pattern of each interactive part, or a difference between all axis coordinates of coordinate information of patterns of two interactive parts.

Taking finger F as an example, the operating position may refer to a position where each finger F is located in the three-dimensional space. Therefore, the operating position may have a three-dimensional coordinate that represents the position where each finger F is located in the three-dimensional space. When the finger F of the user enters the three-dimensional space (i.e., when the user manipulates the electronic apparatus 10), the camera component 102 shoots the three-dimensional space and generates a detection image with a finger pattern of the finger F (i.e., the pattern of the interactive part). The processing unit 104 may analyze the position of the finger pattern of each finger F in the detection image to obtain the X coordinate, the Y coordinate and the Z coordinate of each finger F, thereby generating and sending the first control signal to the ultrasonic component 106.

In some embodiments, the processing unit 104 may receive and send information (such as the detection image and the control signal) in a wired or wireless transmission manner. It should be understood that when the processing unit 104 communicates with other elements (such as the camera component 102 and/or the ultrasonic component 106) in a wireless transmission manner, the two elements (i.e., the processing unit 104 and other elements) that communicate with each other will be coupled to wireless transceivers (not shown) matching each other, respectively, so that the two elements receive and send the information via a communication link established by the two wireless transceivers.

In some embodiments, the processing unit 104 may acquire a coordinate position of the interactive part (and the distribution range of the pattern of the interactive part) based on the detection image provided by the camera component 102, defines generation information of a plurality of oscillating points in one generation cycle, and generates a first control signal with the generation information. The generation information may be a piece of oscillation intensity information and a piece of oscillation position information. In some embodiments, the oscillation intensity information may be an oscillation intensity value of each oscillating point, or is a variation trend of the oscillation intensity values of these oscillating points. In some embodiments, the variation trend of the oscillation intensity value of the oscillating point may be defined as a resolution of energy in an energy level of oscillation wave energy. By way of example, a 512-level energy level (considered as the resolution of energy) may be set for each oscillating point. 0 is defined as minimum energy, and 512 is defined as maximum energy. Furthermore, each energy adjustment may be performed in a plurality of levels as a unit of adjustment. For example, when the energy is adjusted up or adjusted down, the energy of each oscillating point may be adjusted up by five energy levels or adjusted down by five energy levels at once. It should be emphasized that in the aforementioned illustrations, everyone's haptic sense for the oscillating point is different, so the processing unit 104 generates the first control signal after acquiring the coordinate position of the interactive part based on the detection image. That is, energy applied by oscillating points of different objects will be adjusted by the processing unit 104 based on the coordinate position of the interactive part (e.g., the finger F), so that the different objects may obtain better haptic experience. The oscillation position information may be coordinate positions of generation points that start or end generation of these oscillating points, a position variation trend of the generation points of these oscillating points, or the coordinate position of the generation point of each oscillating point. In some embodiments, the processing unit 104 may analyze a coordinate position of a central point P3 (see FIG. 7a) of one or more coordinate positions obtained from the detection image, which may serve as a generation point that starts or ends the generation of a plurality of oscillating points in one generation cycle, and determine the oscillation intensity information and the position variation trend of the generation points of these oscillating points (or further determines coordinate positions of generation points of other oscillating points) by the quantity (i.e., the operating quantity of the interactive parts) and/or distribution range of the patterns of the interactive parts obtained by analyzing the detection image, or variations of the patterns of the interactive parts obtained by analyzing multiple detection images over continuous time.

In some embodiments, the processing unit 104 may acquire the operating quantity and coordinate positions of the interactive parts based on the detection image provided by the camera component 102, defines the generation information of the plurality of oscillating points in one generation cycle, and generates the first control signal with this generation information.

In some embodiments, the ultrasonic component 106 may emit several ultrasonic waves (U1, U2 and U3) from different directions to the operating position after receiving the first control signal. The ultrasonic component 106 continuously emits various ultrasonic waves (U1, U2 and U3) within a generation cycle, so that multiple ultrasonic waves (U1, U2 and U3) of a same emission order within a generation cycle intersect at different points at the operating position to form the first oscillating points P1, and then all the first oscillating points P1 formed by intersection in this generation cycle form a first oscillating clump C1 at the operating position. Specifically, since the first oscillating clump C1 is formed at the operating position, the finger F of the user can haptically feel the position and dimension of the first oscillating clump C1 at the operating position, that is, the user has a haptic sense of touching a physical key.

In some embodiments, the ultrasonic component 106 may include multiple ultrasonic emission units 108 and a controller 110 The controller 110 is connected to the processing unit 104 and the multiple ultrasonic emission units 108. The ultrasonic component 106 may synchronously control all the ultrasonic emission units 108 based on the first control signal. For clarity, it will be illustrated in details below with taking the interactive part being the finger F as an example.

Figure 3B:
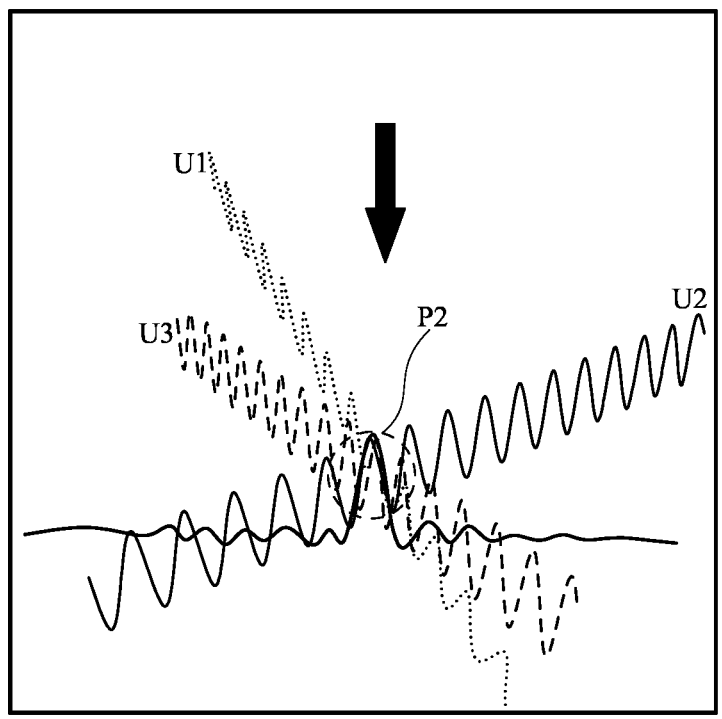
FIG. 3b is a schematic diagram of an electronic apparatus with haptic output forming second oscillating points according to some embodiments.

As shown in FIGS. 2, 3a and 3b, the aforementioned first oscillating clump C1 may be formed by superposition of the ultrasonic waves (U1, U2 and U3) respectively emitted by the ultrasonic emission units 108 located in different orientations. Specifically, the multiple ultrasonic waves (U1, U2 and U3) from different directions will be continuously emit temporally towards multiple points at the operating position to form several first oscillating points P1. Since these first oscillating points P1 have the characteristics of time continuity and three-dimensional region with a given range, when the last one of the first oscillating points P1 is formed, the first one of the first oscillating points P1 has not scattered yet and oscillation ranges of adjacent first oscillating points P1 will overlap each other, so that these first oscillating points P1 overlap into a clump, that is, the first oscillating clump C1. In other words, the three-dimensional region defined by all the first oscillating points P1 formed in one generation cycle defines the dimension of the first oscillating clump C1. Therefore, a region occupied by the finger F of the user in the three-dimensional space (i.e., an overlapping range of the visual range of the camera component 102 and the operating range of the ultrasonic component 106) may be then defined as the operating position. The generation point of each first oscillating point P1 will also correspond to this operating position.

It should be noted that different users may have different senses for the oscillation intensity of the ultrasonic waves. In some embodiments, further as shown in FIGS. 2, 3a and 3b, the ultrasonic component 106 controls the oscillation intensity of each first oscillating point P1 based on the first control signal to determine the haptic sense of the first oscillating clump C1. After the ultrasonic component 106 receives the first control signal, the ultrasonic component 106 synchronously controls emission directions and oscillation intensity of the ultrasonic waves (U1, U2 and U3) of all the ultrasonic emission units 108, so that the oscillation intensity of each first oscillating point P1 may be adjusted together. Furthermore, when the oscillation intensity of each first oscillating point P1 is adjusted, the first oscillating clump C1 will also change the overall oscillation intensity along with each first oscillating point P1. By way of example, as shown in FIG. 2, when contacting the first oscillating clump C1, the finger F of the user may feel the variation in oscillation intensity of the first oscillating clump C1 haptically, in order to change the haptic sense of the first oscillating clump C1 simulating a physical operating part.

For example, the haptic sense regarding touching or grasping operating parts such as a key, a knob or a lever varies.

Figure 4A:
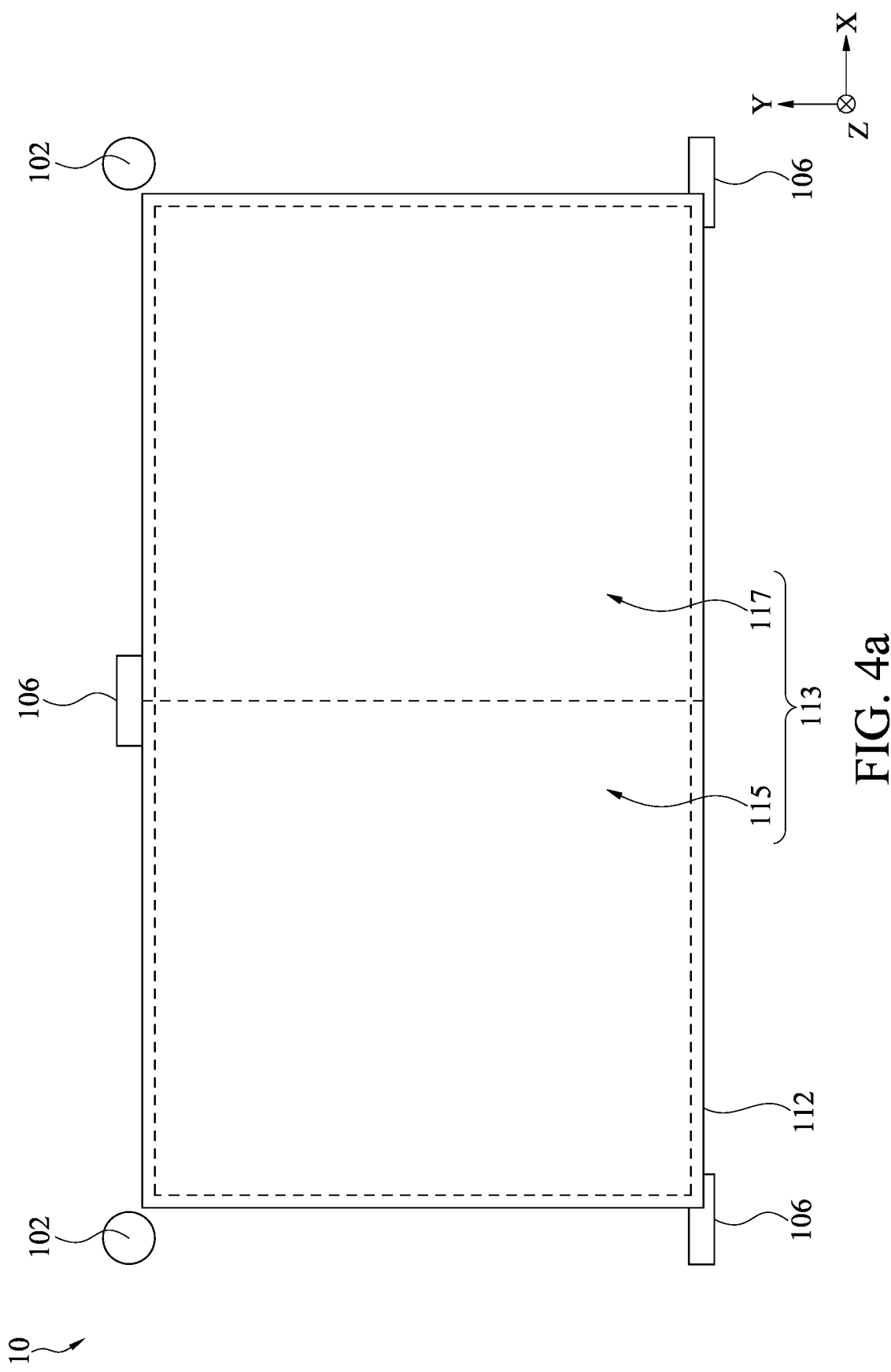
FIG. 4a is a top view of an example of the electronic apparatus with haptic output in FIG. 2, dividing a display screen into a first operating region and a second operating region.

Referring to FIGS. 1, 2 and 4a together, in some embodiments, the electronic apparatus 10 further includes a display component 112. The display component 112 is coupled to the processing unit 104, and is configured to display a display screen 113. The processing unit 104 is configured to generate the display screen 113 associated with the first oscillating clump C1 through the display component 112. It may refer to that when the finger F of the user is located at the operating position (the finger F of the user feels the first oscillating clump C1), the processing unit 104 will display a related display screen 113 on the display component 112 based on the position and/or dimension of the first oscillating clump C1. The display screen 113 may be an image of a virtual operating part (e.g., a virtual key, a virtual knob or a virtual lever) with a position and/or dimension corresponding to the first oscillating clump C1. In some embodiments, the camera component 102 and the ultrasonic component 106 may be provided in proximity to the display component 112, so that the three-dimensional space formed by overlapping of the visual range of the detection image captured by the camera component 102 and the operating range of the ultrasonic component 106 scanning the ultrasonic wave may be adjacent to the display component 112.

In some embodiments, as shown in FIG. 4a, the display screen 113 includes a first operating region 115 and a second operating region 117. The processing unit 104 analyzes the operating quantity (e.g. the quantity of fingers F of the user entering the three-dimensional space) and the operating position of the interactive parts in the detection image, and generates the first control signal. The first operating region 115 and the second operating region 117 may not overlap each other, or may overlap together (detailed in FIG. 4b later).

In some embodiments, the first operating region 115 may be defined as one of a knob operating region and a key operating region, while the second operating region 117 may be defined as the other of the knob operating region and the key operating region.

Referring to FIGS. 1 to 5 together, the first operating region 115 being defined as the knob operating region and the second operating region 117 being defined as the key operating region are taken as an example. When the finger F of the user is located in the first operating region 115 (that is, the finger pattern appears in the first operating region 115 in the detection image) and corresponds to the multi-finger operation (that is, there are at least two separated finger patterns in the detection image, which indicates that the user operates with at least two forked fingers F), the processing unit 104 determines that an expected interactive operation of the finger F of the user meets the condition of the knob operating region (that is, there are two or more finger patterns located in the first operating region 115 and separated from each other in the detection image). At this time, the processing unit 104 may generate a first control signal corresponding to a knob operation. In some embodiments, the ultrasonic component 106 may generate the first oscillating clumps C1 with a quantity the same as that of the fingers F based on the first control signal. In some other embodiments, the ultrasonic component 106 may adjust the generation position of the first oscillating point P1 based on the first control signal, so that the distribution range of the first oscillating point P1 corresponds to a space between at least two fingers F. As such, the finger F of the user can feel the haptic sense regarding grasping the knob.

Referring to FIGS. 1 to 6 together, following the previous examples, when the finger F of the user is located in the second operating region 117 and corresponds to the single-finger operation (that is, there is a single finger pattern or at least two connected finger patterns in the detection image, which indicates that the user operates with one finger F or two combined fingers F), the processing unit 104 determines that the expected interactive operation of the finger F meets the condition of the key operating region (that is, there is a single finger pattern located in the second operating region 117 in the detection image). At this time, the processing unit 104 may generate a first control signal corresponding to a key operation. In some embodiments, the ultrasonic component 106 may generate, based on the first control signal, a first oscillating clump C1 at a position where the finger F is located. In some other embodiments, the ultrasonic component 106 may adjust the generation position of the first oscillating point P1 based on the first control signal, so that the distribution range of the first oscillating point P1 corresponds to a range occupied by the finger F. As such, one finger F of the user can be made to feel the haptic sense regarding contacting the key.

Conversely, if the finger F is in the first operating region 115 and corresponds to the single-finger operation or is in the second operating region 117 and corresponds to the multi-finger operation, the processing unit 104 determines that the expected interactive operation of the finger F does not meet the condition of the knob operation or key operation. For example, if the finger F is to perform the single-finger operation in the first operating region 115 or is to perform the multi-finger operation in the second operating region 117, the processing unit 104 does not generate the first control signal at this time. That is, the ultrasonic component 106 does not emit the ultrasonic waves or stops further emitting ultrasonic waves of a next generation cycle if the aforementioned condition is not met.

Figure 5:
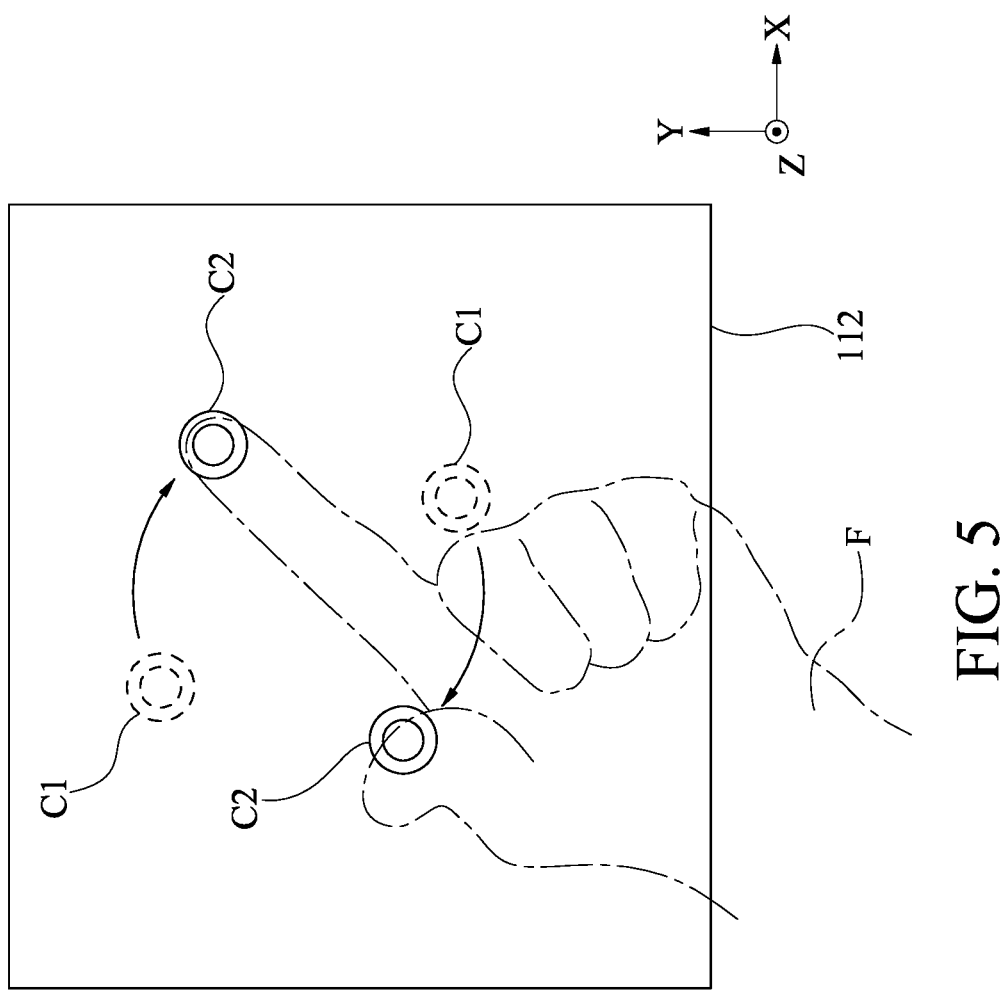
FIG. 5 is a bottom view of an example of applying an electronic apparatus with haptic output to a multi-finger operation according to some embodiments.
Figure 6:
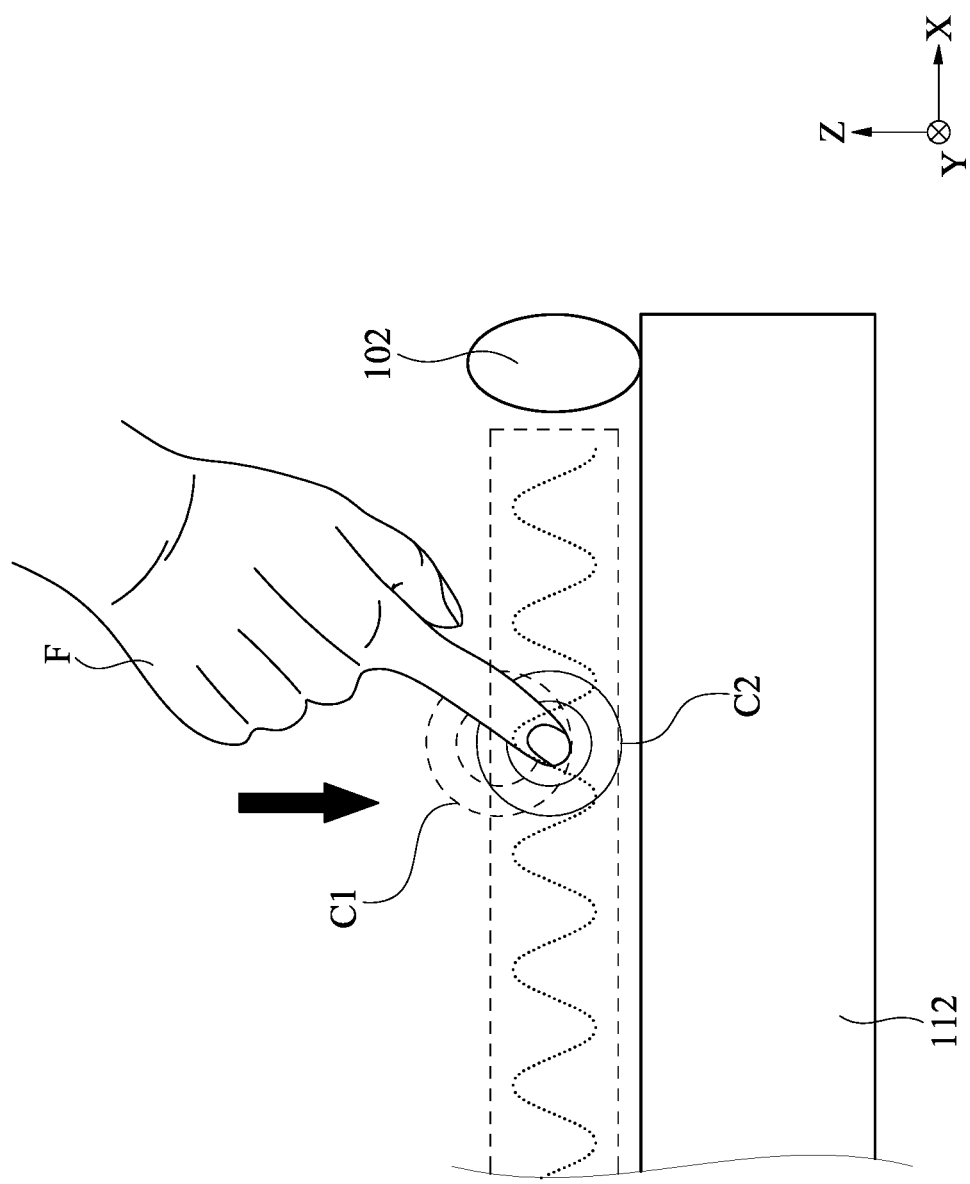
FIG. 6 is a side view of an example of applying an electronic apparatus with haptic output to a single-finger operation according to some embodiments.

In some embodiments, as shown in FIGS. 3b, 5 and 6, after the first oscillating clump C1 is formed, the finger F of the user then performs another operating motion, and the electronic apparatus 10 then may generate a plurality of oscillating points (hereinafter referred to as a second oscillating point P2) to form another oscillating clump (hereinafter referred to as a second oscillating clump C2) from these second oscillating points P2. In this way, the finger F of the user may always be tracked by the oscillating clump (i.e., reflecting that the operating motion of the finger F changes from the first oscillating clump C1 to the second oscillating clump C2). That is, in an operation process, the user may always feel that the finger F actually touches the oscillating clump (i.e. the first oscillating clump C1 or the second oscillating clump C2). Here, the second oscillating point P2 and the second oscillating clump C2 itself are generated in roughly a same way as the aforementioned first oscillating point P1 and the first oscillating clump C1, which therefore will not be repeated. However, due to a variation of the finger F, the generation information of the second oscillating point P2 will have at least one parameter (such as the oscillation intensity information and/or the oscillation position information) different from that of the first oscillating point P1, resulting in that the haptic sense provided by the second oscillating clump C2 to the user is different from that provided by the first oscillating clump C1.

In some embodiments, the processing unit is configured to: receive another detection image through the camera component, analyze the another detection image to obtain an operating motion applied by the interactive part onto the first oscillating clump C1, and generate a second control signal corresponding to the operating motion, and generate the display screen 113 corresponding to an operating motion variation based on the second control signal through the display component 112.

Here, the another detection image may refer to an image captured after the finger F located at the operating position (stop moving when the first oscillating clump C1 is in contact) performs an operation relative to the first oscillating clump C1 to change its position, that is, a position where at least one finger pattern is located in the another detection image is different from a detection image previously captured. The operating motion may refer to a motion of the finger F relative to the first oscillating clump C1 (e.g., a press motion, a rotation motion or a pull-down motion).

In some embodiments, the processing unit 104 may analyze the another detection image by executing an image analysis program (e.g., a neural network model), to identify the operating motion of the finger pattern of the finger F in the another detection image. In some other embodiments, the processing unit 104 may identify the operating motion of the finger F by analyzing a difference between the two detection images (i.e., the another detection image) captured before and after.

In some embodiments, after the processing unit 104 generates the second control signal, the display component 112 displays a display screen 113 corresponding to an operating motion variation based on the second control signal. As such, the display screen 113 may be linked to the operating motion. In other words, there is a variation that the virtual operating part is manipulated in content of the display screen 113 of the display component 112. By way of example, there is a variation that the virtual key is pressed, a variation that the virtual knob is turned or a variation that the virtual lever is pulled down in the content of the display screen 113.

Figure 4B:
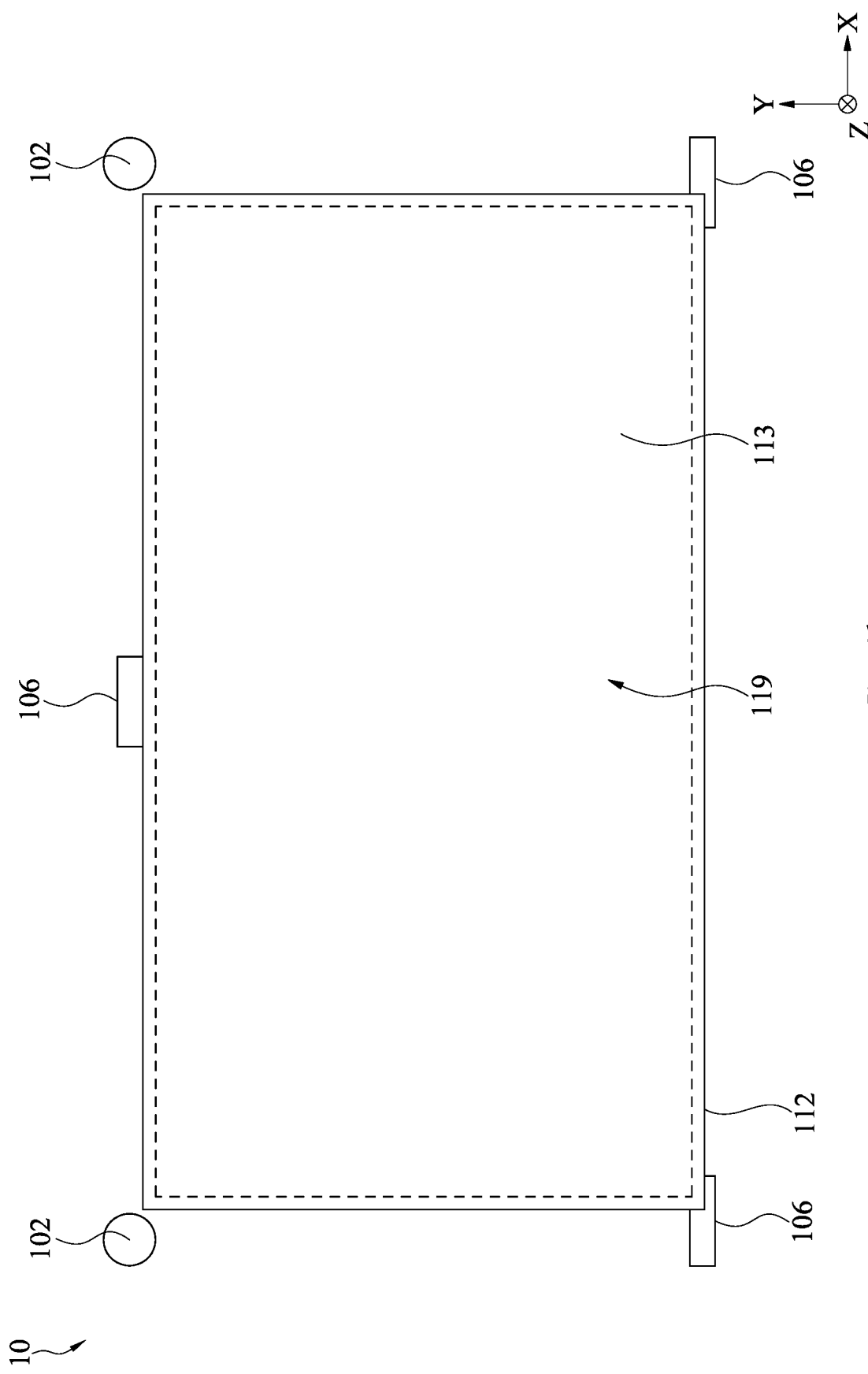
FIG. 4b is a top view of an example of the electronic apparatus with haptic output in FIG. 2, dividing a display screen into a global operating region.

In some embodiments, referring to FIGS. 4b, 5 and 6 together, the display screen 113 includes a global operating region 119. The processing unit 104 analyzes the operating quantity and the operating position of the interactive parts in the detection image, and generates the first control signal. By way of example, in response to the interactive part being located in the global operating region 119, the processing unit 104 determines, based on the operating quantity, whether the interactive part corresponds to one of the single-finger operation or the multi-finger operation, and generates a first control signal corresponding to the single-finger operation or the multi-finger operation. It should be noted that the global operating region 119 may be either the aforementioned knob operating region or the key operating region. The processing unit 104 may determine, based on the single-finger operation or the multi-finger operation, whether the current global operating region 119 serves as the knob operating region or the key operating region. Taking the finger F as an example of the interactive part, after the camera component 102 captures the detection image from the global operating region 119, the processing unit 104 may determine, based on the quantity of the fingers F in the detection image, whether the interactive part corresponds to the multi-finger operation or the single-finger operation. If the finger F corresponds to the multi-finger operation, it is determined that the global operating region 119 is the knob operating region. Conversely, if the finger F corresponds to the single-finger operation, it is determined that the global operating region 119 is the key operating region. The processing unit 104 then generates a first control signal corresponding to an operating mode based on the multi-finger operation or the single-finger operation, so that the ultrasonic component 106 may generate a corresponding number of first oscillating clumps C1 based on the first control signal. Reference may be made to descriptions of FIGS. 5 and 6 for specific implementation processes of the processing unit 104 and the ultrasonic component 106.

Further as shown in FIGS. 3b, 5 and 6, in some embodiments, output the second control signal to the ultrasonic component 106 and generate a plurality of second oscillating points P2 at the operating position based on the second control signal to provide a second oscillating clump C2 different from the first oscillating clump C1. It should be noted that the first oscillating point P1 in FIG. 3a is a position where the camera component 102 captures a detection image of the interactive part when the interactive part enters the overlapping range of the visible range and the operating range. After the second oscillating point P2 in FIG. 3b is an oscillating point generated based on the second control signal through the ultrasonic component 106 after the interactive part moves from the first oscillating point P1. Based on this, the oscillation position of the second oscillating point P2 varies based on the position of the interactive part.

In some embodiments, the second oscillating clump C2 formed by the plurality of second oscillating points P2 has an appearance different from that of the first oscillating clump C1. Specifically, the ultrasonic component 106 may adjust signal parameters and/or target intersection points of the emitted ultrasonic waves based on the second control signal, and then emit the ultrasonic waves accordingly, so that at least one of the plurality of second oscillating points P2 has an oscillation position and/or oscillation intensity different from those/that of the plurality of first oscillating points P1.

In some embodiments, the second oscillating clump C2 may have a variation in displacement relative to the first oscillating clump C1 and/or a variation in oscillation intensity with a motion locus of the finger F of the user. In an example, the aforementioned variation in oscillation intensity may be, for example, the oscillation intensity of each first oscillating point P1 synchronously attenuates, enhances or alternates between strong and weak, thus forming a second oscillating clump C2 that provides a real haptic sense regarding pressing the key. In another example, the aforementioned variation in oscillation intensity may also be the oscillation intensity of these first oscillating points P1 that synchronously attenuates or enhances in an equal difference or equal ratio in arrangement order or alternates between strong and weak, thus forming a second oscillating clump C2 that provides a real haptic sense regarding turning the knob.

In some embodiments, further as shown in FIG. 5, taking operating the virtual knob as an example, when the finger F of the user makes the rotation motion to the first oscillating clump C1, the processing unit 104 may obtain a rotation movement locus of the rotation motion (i.e. the operating motion) by analyzing the detection image, and generates a second control signal based on the rotation movement locus of the rotation motion. Here, an application program executed by the processing unit 104 will generate, in response to the second control signal, a stream of multiple display screens 113 with continuous time. The display component 112 receives and displays this stream, so that the virtual knob in its external display screen 113 may vary with the rotation motion of the finger F of the user. Furthermore, the ultrasonic component 106 continuously generates, based on the second control signal, the second oscillating clumps C2 that vary with the rotation motion of the finger F of the user, so that the second oscillating clumps C2 may synchronously make rotation movement with the finger F of the user in continuous time, to keep the finger F of the user have a haptic sense of continuously touching the knob. Specifically, the second oscillating clump C2 may keep continuous oscillation of an inner side of the front end of each finger F of the user, so that the finger F of the user has a haptic sense of continuously pinching and turning the knob. In some embodiments, the second oscillating clump C2 formed may also vary in oscillation intensity and oscillation order as a rotation movement locus of the finger F of the user.

Further as shown in FIG. 6, taking operating the virtual key as an example, when the finger F of the user makes the press motion to the first oscillating clump C1, the processing unit 104 may obtain a linear movement locus of the press motion (i.e. the operating motion) by analyzing the detection image, and generates a second control signal based on the linear movement locus of the press motion. Here, an application program executed by the processing unit 104 will generate, in response to the second control signal, a stream of multiple display screens 113 with continuous time. The display component 112 receives and displays this stream, so that the virtual key in its display screen 113 may vary with the press motion of the finger F of the user. Furthermore, the ultrasonic component 106 continuously generates, based on the second control signal, the second oscillating clumps C2 that vary with the press motion of the finger F of the user, so that the second oscillating clumps C2 may synchronously move with the finger F of the user. Specifically, the second oscillating clump C2 may keep continuous oscillation of the front end of the finger F of the user, so that the finger F of the user has a haptic sense of continuously touching and pressing the key. In some embodiments, the oscillation intensity varies with the linear movement locus of the finger F of the user.

In some embodiments, reference is made to FIGS. 3a, 3b and 6 together. The processing unit 104 adjusts, in accordance with a relative distance relationship between the plurality of first oscillating points P1, the plurality of second oscillating points P2 and the display screen 113 and based on the oscillation intensity of the plurality of first oscillating points P1, the oscillation intensity of the plurality of second oscillating points P2. Specifically, the processing unit 104 may determine from another detection image that the operating motion is the press motion. The processing unit 104 adjusts, in accordance with a position variation relationship of operating positions of finger patterns in detection images at previous and next moments and based on the oscillation intensity of the plurality of first oscillating points P1, the oscillation intensity of the plurality of second oscillating points P2.

By way of example, the press motion is taken as an example of the operating motion. When the processing unit 104 analyzes that the finger F of the user is approaching the display screen 113, the processing unit 104 may generate a second control signal with an oscillation intensity enhancement instruction, so that the ultrasonic component 106 may enhance the oscillation intensity of the plurality of second oscillating points P2 relative to the first oscillating points P1 based on the oscillation intensity enhancement instruction. Conversely, when the processing unit 104 analyzes that the finger F of the user moves away from the display screen 113, the processing unit 104 may generate a second control signal with an oscillation intensity weakening instruction, so that the ultrasonic component 106 may weaken the oscillation intensity of the plurality of second oscillating points P2 relative to the first oscillating points P1 based on the oscillation intensity weakening instruction.

In some embodiments, the number of the oscillating points (i.e., the first oscillating points P1 or the second oscillating points P2) forming one oscillating clump (i.e., the first oscillating clump C1 or the second oscillating clump C2) may be 6, 7, 8 or more. Each oscillating point refers to a position point of a wave peak with a maximum amplitude in a synthetic signal synthesized from intersecting ultrasonic waves U1, U2, and U3.

Referring to FIGS. 3a, 3b, 5 and 7a, in some embodiments, in terms of the generation position of the oscillating point, the oscillating points (first oscillating points P1 or second oscillating points P2) forming any oscillating clump (first oscillating clump C1 or second oscillating clump C2) includes a central point P3 and a plurality of scattered points P4. The scattered points P4 are located on the periphery of the central point P3 and surround the central point P3. The oscillation range of the central point P3 and the oscillation range of the plurality of scattered points P4 locally overlap, thus forming an oscillating clump (first oscillating clump C1 or second oscillating clump C2), i.e., a synthetic signal formed by overlapping of the synthetic signal of the central point P3 and synthetic signals of the multiple scattered points P4.

In terms of an order in which intersections are formed, the central point P3 and the scattered points P4 are generated successively in a rotation direction. The rotation direction may be a clockwise direction or a counterclockwise direction.

Figure 7B:
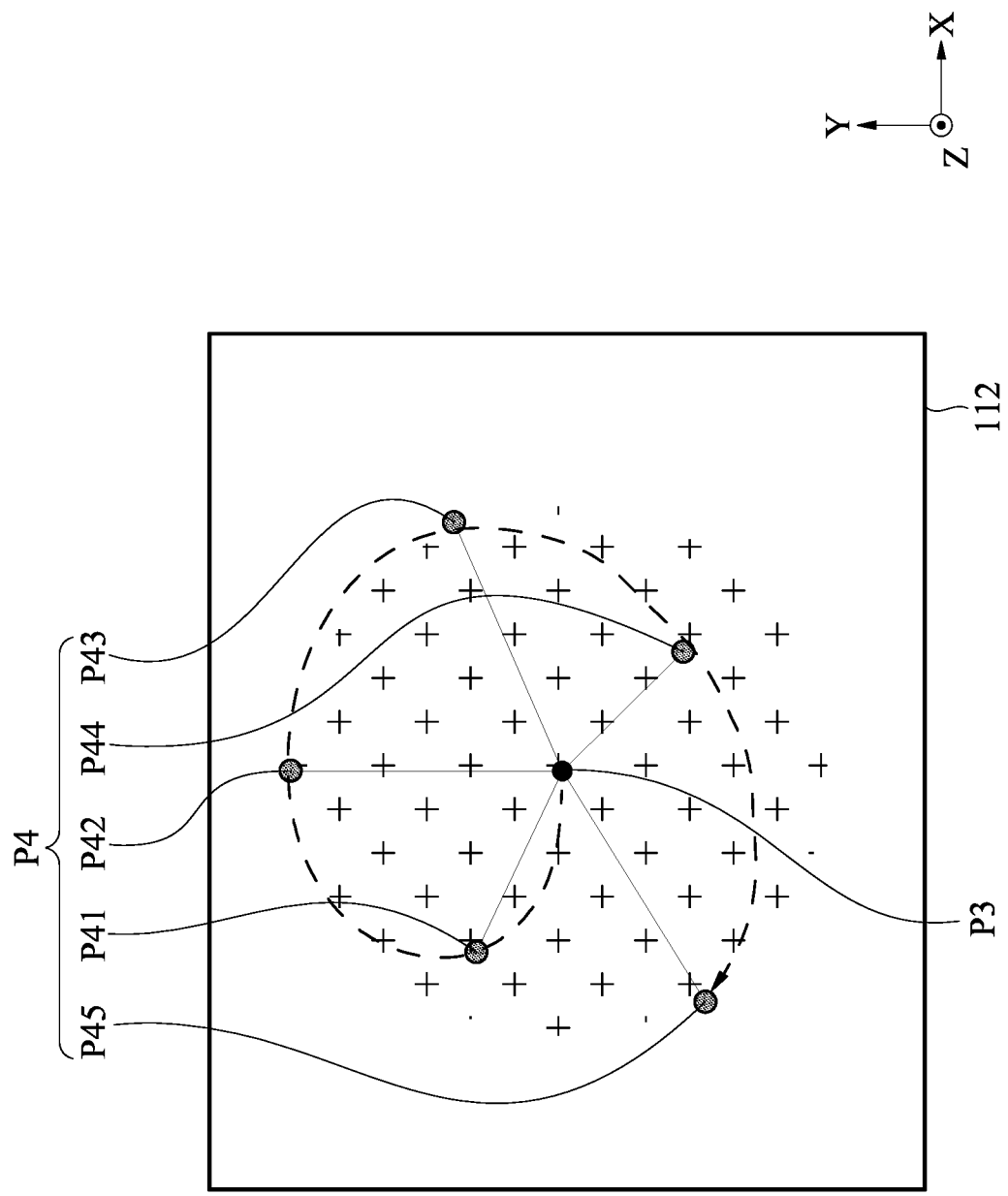
FIG. 7b is a schematic diagram of an example of an electronic apparatus with haptic output rotating in a clockwise direction to form a second oscillating clump according to some embodiments.

In an example, referring to FIGS. 1 and 7b together, the rotation direction may be an inward-to-outward rotation direction. Specifically, the ultrasonic component 106 is to firstly generate the central point P3 and then generates the plurality of scattered points P4 sequentially in the rotation direction. By way of example, the ultrasonic component 106 generates the central point P3, a scattered point P41, a scattered point P42, a scattered point P43, a scattered point P44 and a scattered point P45 one by one and successively in the clockwise direction.

Figure 7C:
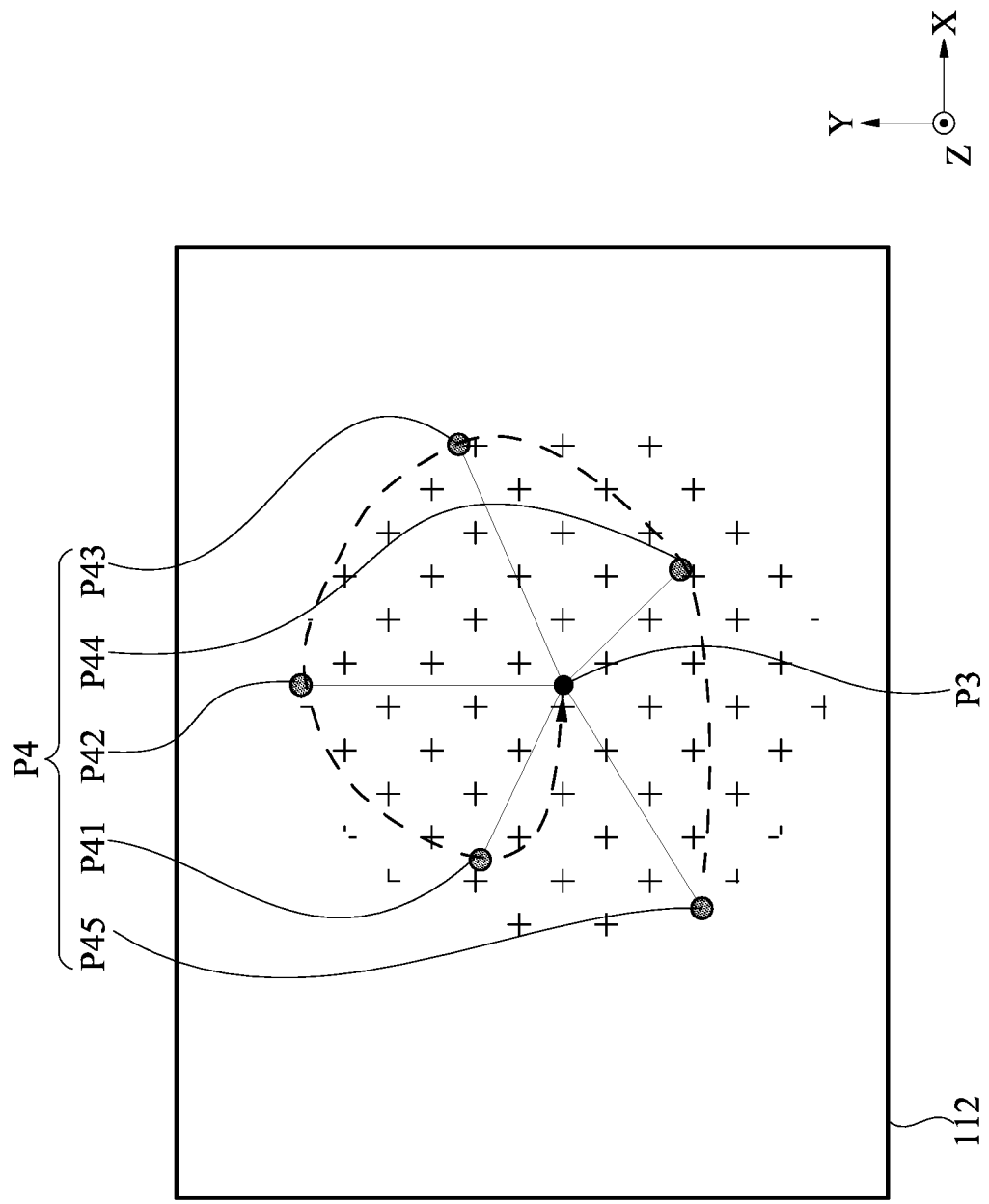
FIG. 7c is a schematic diagram of an example of an electronic apparatus with haptic output rotating in a counterclockwise direction to form a second oscillating clump according to some embodiments.

In another example, referring to FIGS. 1 and 7c together, the rotation direction may be an outward-to-inward rotation direction. In other words, the ultrasonic component 106 is to sequentially generate the plurality of scattered points P4 and finally generates the central point P3 in a rotation direction. By way of example, the ultrasonic component 106 generates the scattered point P45, the scattered point P44, the scattered point P43, the scattered point P42, the scattered point P41 and the central point P3 one by one and successively in the counterclockwise direction.

Further as shown in FIGS. 3a, 3b, 7b and 7c, in some embodiments, the generation order of the second oscillating points P2 may be determined based on the motion direction of the movement locus of the operating motion. Specifically, the ultrasonic component 106 may sequentially generate, based on the second control signal, the second oscillating points P2 in a rotation direction opposite to the motion direction of the movement locus of the operating motion. As such, the second oscillating clump C2 formed can provide the user with a resistance haptic sense, so that the user has a haptic sense similar to a haptic sense like touching the operating part really.

By way of example, in an example, when the motion direction of the movement locus of the operating motion is to the right, the second oscillating points P2 are generated sequentially in the counterclockwise direction to form the second oscillating clump C2 that provides the resistance haptic sense. In another example, when the motion direction of the movement locus of the operating motion is to the left, the second oscillating points P2 are generated sequentially in the clockwise direction to form the second oscillating clump C2 that provides the resistance haptic sense.

Further as shown in FIGS. 7b and 7c, in some embodiments, the ultrasonic component 106 may sequentially enhance or sequentially weaken the oscillation intensity of the second oscillating point P2 or make the oscillation intensity alternate between strong and weak based on the motion direction of a rotation locus of the operating motion, and generates all the scattered points P4 in a rotation direction opposite to the rotation locus of the operating motion. The aforementioned ultrasonic component 106 makes the oscillation intensity alternate between strong and weak based on the rotation direction of the rotation locus, which may refer to that an initial oscillating point (one of the central point P3 or the scattered point P45) and a final oscillating point (the other of the central point P3 or the scattered point P45) has maximum oscillation intensity, while oscillating points (scattered points P41, P42, P43 and P44) between the initial oscillating point and the final oscillating point may have oscillation intensity less than that of the initial oscillating point or the final oscillating point.

By way of example, reference is made to FIGS. 5, 3b, 7b and 7c. In an example, as shown in FIG. 7c, when the rotation direction of the operating motion is clockwise, the processing unit 104 generates a second control signal with an oscillation trigger instruction. The ultrasonic component 106, in response to the oscillation trigger instruction and by a counterclockwise locus, firstly generates the scattered point P45 and central point P3 with the maximum oscillation intensity, and subsequently, sequentially generates, from the scattered point P45 to the central point P3, the scattered points P44, P43, P42 and P41 with the oscillation intensity gradually increasing, decreasing or alternating between strong and weak. In another example, as shown in FIG. 7b, when the rotation direction of the operating motion is counterclockwise, the ultrasonic component 106, in response to the oscillation trigger instruction and by a clockwise locus, firstly generates the scattered point P45 and central point P3 with the maximum oscillation intensity, and subsequently, sequentially generates, from the central point P3 to the scattered point P45, the scattered points P41, P42, P43 and P44 with the oscillation intensity gradually increasing, decreasing or alternating between strong and weak. Furthermore, since orders for the second oscillating point P2 to generate oscillations at the central point P3 and the scattered point P4 and rotation directions are opposite, the hand of the user may obviously feel the oscillation variation of the second oscillating clump C2, thereby simulating a haptic sense of turning (turning clockwise or turning counterclockwise) a knob switch.

Further as shown in FIGS. 1, 3a, 3b, 5 and 7a, in some embodiments, the first oscillating point P1 and the second oscillating point P2 may have different generation orders of the central point P3 and the scattered point P4. By way of example, when the ultrasonic component 106 generates the first oscillating point P1, the first oscillating point P1 may sequentially generate the central point P3, the scattered point P41, the scattered point P42, the scattered point P43, the scattered point P44 and the scattered point P45 in an inward-to-outward rotation manner. The scattered point P45, the scattered point P44, the scattered point P43, the scattered point P42 and the scattered point P41 and the central point P3 may also be generated sequentially in an outward-to-inward rotation manner. When the ultrasonic component 106 generates the second oscillating point P2, the generation orders of the central point P3 and the scattered point P4 and the motion directions of the interactive parts are opposite. Therefore, the central points P3 and the scattered points P4 of the first oscillating point P1 and the second oscillating point P2 may have a same generation order or different generation orders.

In some embodiments, when the first oscillating point P1 and the second oscillating point P2 may have different generation orders, the variation in oscillation intensity and/or the rotation direction of the second oscillating point P2 relative to the first oscillating point P1 may depend on the operating motion.

Further as shown in FIGS. 1 and 2, in some embodiments, the electronic apparatus 10 further includes a peripheral component 114. The peripheral component 114 is coupled to the processing unit 104, and the peripheral component 114 is configured to adjust an output operation based on the second control signal. Specifically, the second control signal may include a control instruction for controlling the output operation of the peripheral component 114. When the user applies the operating motion to the first oscillating clump C1, the processing unit 104 may analyze the detection image to obtain the operating motion applied by the user and generate a second control signal with a control instruction corresponding to this operating motion. The peripheral component 114 may execute the control instruction based on the second control signal, thereby changing the output operation, for example, adjustment to volume, adjustment to temperature or switching of switch states.

In some embodiments, the user or a software/firmware designer may pre-define control instructions corresponding to various operating motions. After acquiring the operating motion applied by the user, the processing unit 104 then finds and obtains a control instruction corresponding to this operating motion from the pre-defined control instruction, and generates and outputs a second control signal to the peripheral component 114 accordingly, causing the peripheral component 114 to change a corresponding output operation due to execution of the control instruction.

By way of example, an audio device is taken as an example of the peripheral component 114. When the operating motion is a clockwise rotation motion, the processing unit 104 generates a second control signal with a volume boosting instruction. After receiving the second control signal, the audio device will execute the volume boosting instruction, so that the play volume becomes high, that is, the play volume is boosted. When the operating motion is a counterclockwise rotation motion, the processing unit 104 generates a second control signal with a volume turn-down instruction. After receiving the second control signal, the audio device will execute the volume turn-down instruction, so that the play volume becomes low, that is, the play volume is turned down.

In another example, a lighting device is taken as an example of the peripheral component 114. When the operating motion is the press motion, that is, the finger F of the user is pressed down towards the first oscillating clump C1, the processing unit 104 generates a second control signal with a switching instruction. After receiving the second control signal, the lighting device, in response to the switching instruction, performs switching from turning on lighting to turning off the lighting, or in response to the switching instruction, performs switching from turning off the lighting to turning on the lighting.

According to the above descriptions, this case may provide a method for controlling haptic output, which is applicable to the electronic apparatus 10 to provide actuation that the electronic apparatus 10 implements any of the above embodiments. The method for controlling haptic output executed through the processing unit 104.

Reference is made to FIGS. 1 to 8 together. In some embodiments, step S50 of the method for controlling haptic output includes: receiving, by a processing unit, a detection image through a camera component (step S51), analyzing, by the processing unit 104, the detection image to obtain an operating position of an interactive part (step S52), generating, by the processing unit 104, a first control signal based on the operating position (step S53), and generating, by the ultrasonic component 106, a plurality of first oscillating points P1 forming a first oscillating clump C1 at the operating position based on the first control signal (step S54).

In some embodiments, in step S51, when the interactive part enters the three-dimensional space formed by the visible range and the operating range of the ultrasonic component 106, the camera component 102 may capture a detection image containing the pattern of the interactive part. In some embodiments, the camera component 102 may firstly convert the detection image into an image format that can be read by the processing unit 104, and then transmit the converted detection image to the processing unit 104.

In some embodiments, in step S52, after the processing unit 104 obtains the detection image, a position where the pattern of the interactive part is located in the detection image may be analyzed to obtain the coordinate position of the interactive part in the three-dimensional space to serve as an operating position with coordinate information. In some embodiments, the processing unit 104 may also obtain the operating quantity of the interactive part (such as the quantity of the fingers F) by analyzing the detection image. By way of example, when the user enters the three-dimensional space with two fingers F for manipulation, the processing unit 104 may obtain, based on a case where there are two finger patterns in the detection image, information about the quantity of fingers being "two".

In some embodiments, in step S53, the processing unit 104 may generate the first control signal based on the operating position. In some embodiments, the processing unit 104 generates a first control signal with a coordinate position of the operating position based on the current coordinate position (i.e., the operating position) of the interactive part. In some embodiments, the processing unit 104 may also generate a first control signal with an instruction for controlling the ultrasonic component 106 to generate the first oscillating clumps C1, with the quantity equal to the operating quantity of the interactive part, at the operating position of the interactive part.

In some embodiments, in step S53, the processing unit 104 may generate the first control signal based on one of the operating position or the operating quantity. In some embodiments, the processing unit 104 generates a first control signal with a coordinate position of the operating position based on the current coordinate position (i.e., the operating position) of the interactive part. In some embodiments, the processing unit 104 may also generate the first control signal with the coordinate position of the operating position based on the operating quantity at the operating position of the interactive part.

In some embodiments, in step S54, the ultrasonic component 106 generates the first oscillating clump C1 at the operating position based on the first control signal. For example, the first oscillating clump C1 is formed at the position of the finger F. In this way, the user may feel the simulated sense of touching the key due to the oscillation of the first oscillating clump C1.

Figure 8:
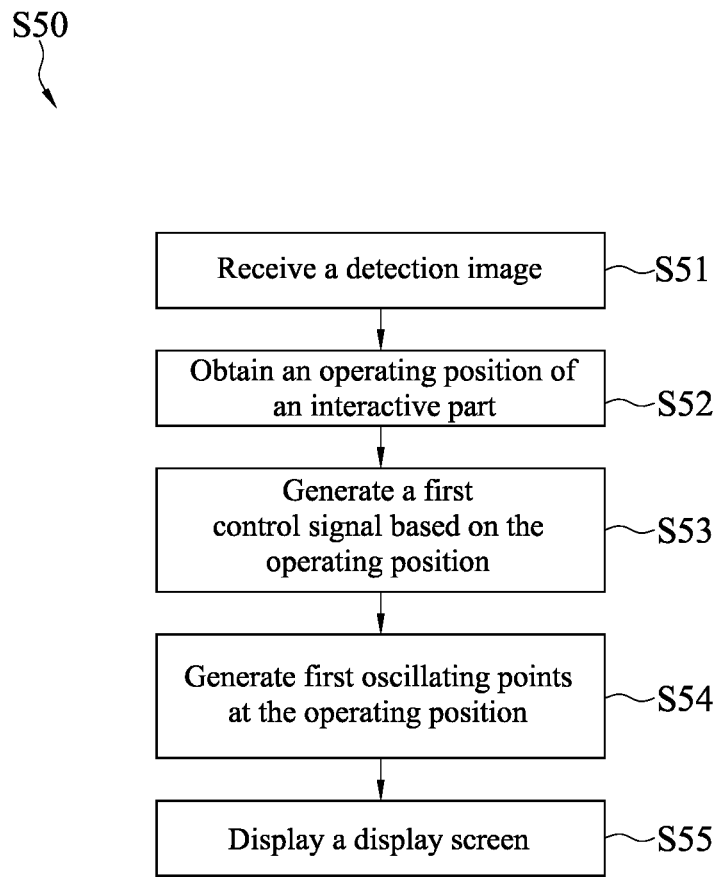
FIG. 8 is a flowchart of a method for controlling haptic output according to some embodiments.

As shown in FIG. 8, in some embodiments, step S54 includes: firstly generating, by the ultrasonic component 106, the central point P3 at the center of the operating position, and subsequently generating a plurality of scattered points P4 on the periphery of the central point P3 sequentially in the rotation direction, as shown in FIG. 7b.

As shown in FIG. 8, in some other embodiments, step S54 includes: generating, by the ultrasonic component 106, the plurality of scattered points P4 sequentially on the periphery of the operating position and finally generating the central point P3 at the center of the operating position in the rotation direction, as shown in FIG. 7c.

As shown in FIG. 8, in some embodiments, step S50 of the method for controlling haptic output further includes: displaying, by the display component 112, a display screen 113 (step S55). The first oscillating clump C1 is associated with the display screen 113.

In some embodiments, in step S55, the ultrasonic component 106 generates the first oscillating clump C1 at the operating position based on the first control signal. Moreover, the display component 112 may also display a predefined picture of the virtual operating part (for example, displaying a display screen 113 with this picture) or an image (for example, projecting an image of the virtual operating part) based on the first control signal. As such, the haptic and visual senses of the user may be synchronized, thereby enhancing the simulated operating experience of the virtual operating part.

Figure 9:
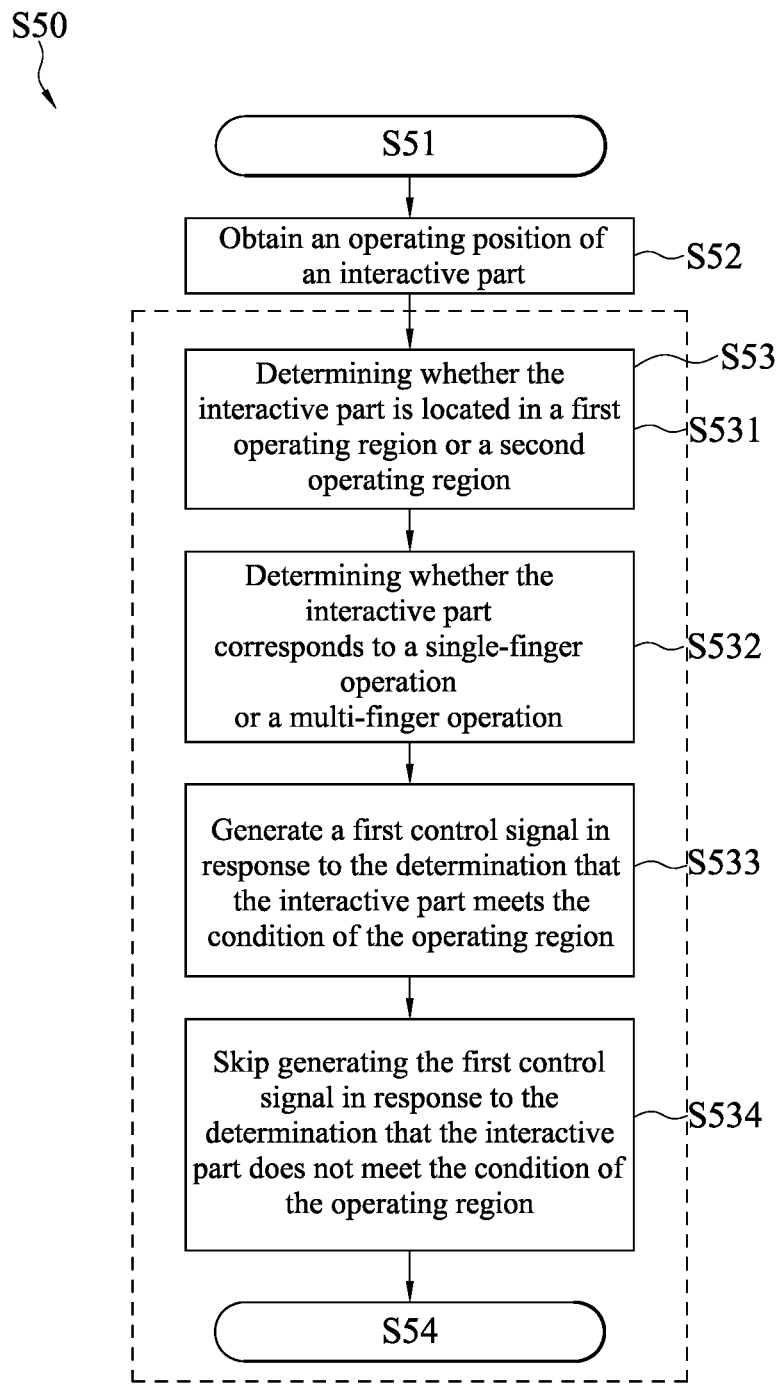
FIG. 9 is a detailed flowchart of an example of step S53 in FIG. 8.

As shown in FIG. 9, in some embodiments, step S53 includes: determining, by the processing unit 104 and based on the operating position, whether the interactive part is located in the first operating region 115 or located in the second operating region 117 (step S531); determining, by the processing unit 104 and based on the quantity of fingers, whether the interactive part corresponds to a single-finger operation or a multi-finger operation (step S532); generating, by the processing unit 104, a first control signal in response to the interactive part being located in the first operating region 115 and corresponding to the multi-finger operation, or in response to the interactive part being located in the second operating region 117 and corresponding to the single-finger operation (step S533). In some embodiments, skipping generating, by the processing unit 104, the first control signal in response to the interactive part being located in the first operating region 115 and corresponding to the single-finger operation, or in response to the interactive part being located in the second operating region 117 and corresponding to the multi-finger operation (step S534).

In some embodiments, in step S531, after the processing unit 104 analyzes the detection image to obtain the operating position of the interactive part, the first operating region 115 and the second operating region 117 are in the three-dimensional space formed by the visible range and the operating range. The processing unit 104 may determine whether the finger F is located in the first operating region 115 or the second operating region 117 based on the current coordinate position of the finger F.

In some embodiments, in step S532, the processing unit 104 determines, based on the operating quantity of the interactive parts, whether the interactive part corresponds to the single-finger operation or the multi-finger operation. The single-finger operation may refer to that the operating quantity of the finger F of the user is a single finger. Although the operating quantity of the fingers F is two fingers, a form that the two fingers are put together into a single finger may also be determined as the single-finger operation. The multi-finger operation may refer to that the quantity of the fingers F is two or more, and all the fingers are separated from each other.

In some embodiments, in steps S533 and S534, the processing unit 104 may determine, based on the finger F being located in the first operating region 115 or the second operating region 117, whether the first control signal is generated or not. In some embodiments, the first operating region 115 may be defined as the knob operating region, and the second operating region 117 may be defined as the key operating region. Therefore, in step S533, when the finger F is located in the first operating region 115 and corresponds to the multi-finger operation, or when the finger F of the user is located in the second operating region 117 and corresponds to the single-finger operation, the processing unit 104 determines that the quantity of fingers in the first operating region 115 or the quantity of fingers in the second operating region 117 meets the condition, and then the first control signal may be generated. Conversely, in step S534, the processing unit 104 determines that the quantity of fingers in the first operating region 115 or the quantity of fingers in the second operating region 117 does not meet the condition, and then the first control signal is not generated.

In some embodiments, referring to FIGS. 1 to 10, step S50 of the method for controlling haptic output further includes: receiving, by the camera component 102, another detection image through the camera component 102 (step S61), analyzing, by the processing unit 104, the another detection image to obtain an operating motion applied onto the first oscillating clump C1 (step S62), generating, by the processing unit 104, a second control signal corresponding to the operating motion (step S63), and displaying, by the display component 112, a display screen 113 corresponding to the operating motion based on the second control signal (step S64). The first oscillating clump C1 is associated with the display screen 113.

In some embodiments, in step S61, in a case where the ultrasonic component 106 has generated the first oscillating clump C1, the camera component 102 captures a motion image of the interactive part applied onto the first oscillating clump C1. It should be noted that step S61 may be executed after step S54 is completed.

In some embodiments, in step S62, the processing unit 104 analyzes the detection image to obtain the operating motion applied onto the first oscillating clump C1. The operating motion may refer to the press motion or the rotation motion.

In some embodiments, in step S63, the processing unit 104 generates the second control signal based on the operating motion. The second control signal may include the generation information, the control instruction or a combination thereof of the second oscillating point P2.

Figure 10:
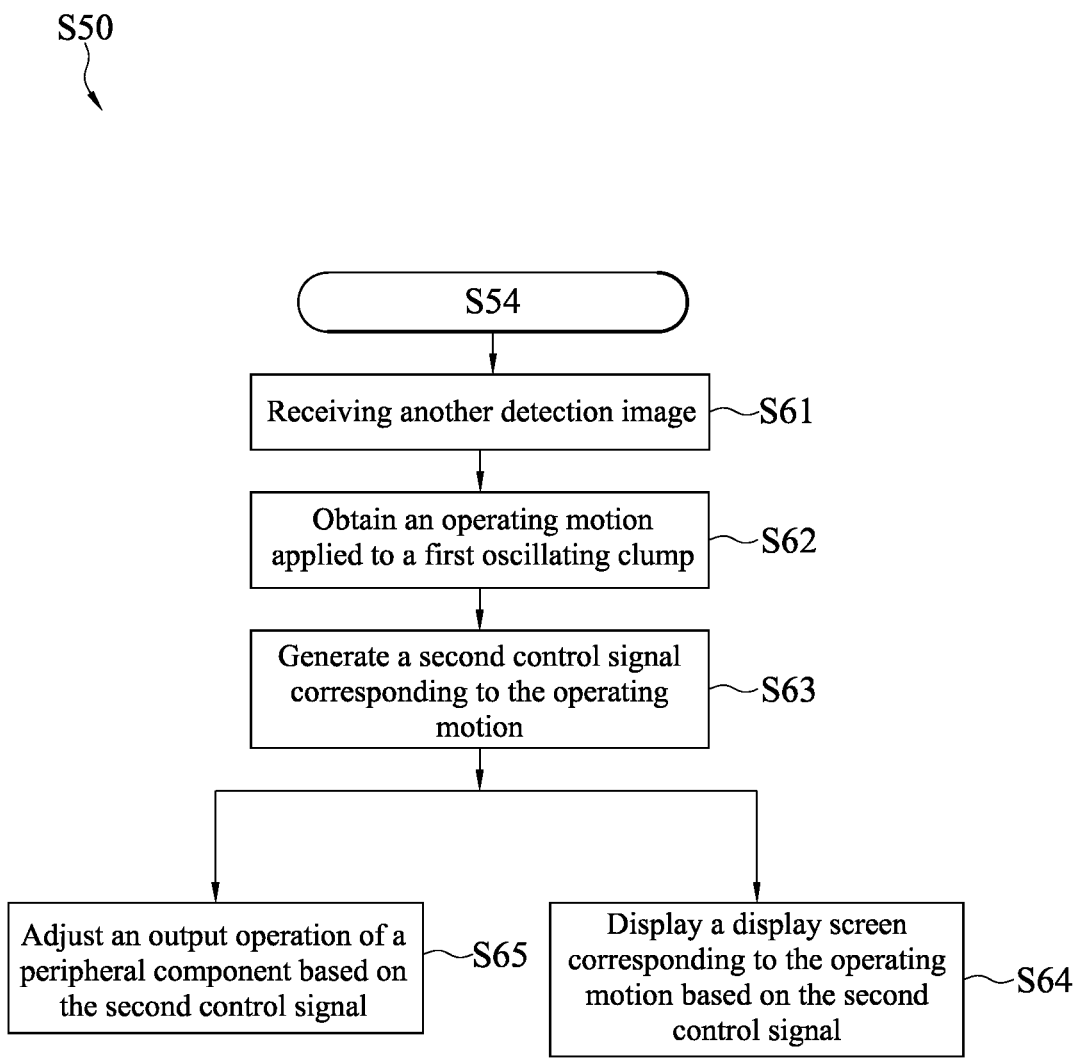
FIG. 10 is a flowchart of a method for controlling haptic output according to some other embodiments.

In some embodiments, further as shown in FIG. 10, step S50 of the method for controlling haptic output further includes: adjusting, by the peripheral component 114, the output operation based on the second control signal (step S65). It should be noted that after step S63 is completed, step S64 or step S65 may be selectively executed.

In some embodiments, in step S65, when the processing unit 104 generates the second control signal, the control instruction of the peripheral component 114 is defined. The peripheral component 114 may be adjusted in its output operation based on the second control signal (for example, adjusting volume output or adjusting air conditioning temperature).

Reference is made to FIGS. 1 to 11 together. In some embodiments, step S50 of the method for controlling haptic output further includes: receiving, by the camera component 102, another detection image through the camera component (step S71), analyzing, by the processing unit 104, the another detection image to obtain an operating motion applied onto the first oscillating clump C1 (step S72), generating, by the processing unit 104, a second control signal corresponding to the operating motion (step S73), and generating, by the ultrasonic component 106, a plurality of second oscillating points P2 at the operating position based on the second control signal (step S74).

At least one of the plurality of second oscillating points P2 has an oscillation position and/or oscillation intensity different from those/that of the plurality of first oscillating points P1, and the plurality of second oscillating points P2 form a second oscillating clump C2 with an appearance different from that of the first oscillating clump C1.

Steps S71 to S74 may be executed after step S54 is completed.

In some embodiments, in step S72, the processing unit 104 analyzes the another detection image to obtain the operating motion applied onto the first oscillating clump C1. In this embodiment, the interactive parts are at least two fingers F, and the operating motion refers to the rotation motion.

In some embodiments, in step S73, the processing unit 104 generates the second control signal based on the operating motion (rotation motion).

In step S74, the processing unit 104 may generate a second control signal corresponding to the operating quantity. For example, as shown in FIG. 5, taking the operating quantity being two fingers F as an example, the processing unit 104 makes a first oscillating clump C1 formed at the position of each finger F, with several first oscillating clumps C1 formed by the plurality of first oscillating points P1. The ultrasonic component 106 may generate a plurality of second oscillating points P2 based on the second control signal and several second oscillating clumps C2 are formed, so that a second oscillating clump C2 is formed at the position of each finger F.

In some embodiments, the aforementioned "at least one of the plurality of second oscillating points P2 has an oscillation position and/or oscillation intensity different from those/that of the plurality of first oscillating points P1" may refer to that the ultrasonic component 106 locates the operating position of each finger F based on the second control signal, and generates the second oscillating clump C2 at the operating position. Furthermore, the second oscillating clump C2 may be adjusted in terms of oscillation intensity based on the position of the finger F of the user. Therefore, each second oscillating point P2 may generate more oscillation variations compared to each first oscillating point P1. By way of example, adjusting the oscillation intensity may refer to that each second oscillating point P2 attenuates or enhances or alternates between strong and weak in order of arrangement in terms of oscillation intensity, forming a haptic sense of turning the knob.

In some embodiments, in step S74, the plurality of second oscillating points P2 are generated between the oscillation positions of the plurality of first oscillating points P1 and the display screen 113. That is, when the operating motion is the press motion, the movement distance of the finger F (i.e., the movement locus of the operating position) may be limited between the first oscillating clump C1 and the display screen 113.

Figure 11:
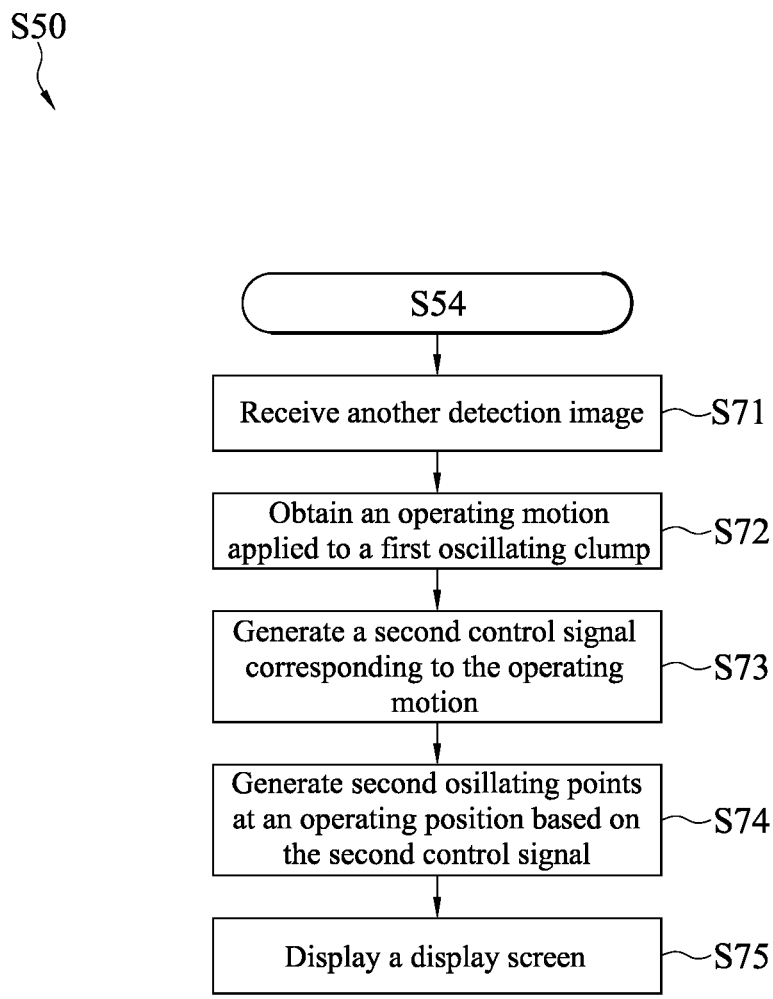
FIG. 11 is a flowchart of a method for controlling haptic output according to yet some embodiments.

In some embodiments, as shown in FIG. 11, step S50 of the method for controlling haptic output further includes: displaying, by the display component 112, the display screen 113 (step S75). The first oscillating clump C1 is associated with the display screen 113, and the operating motion is the interactive part moving towards the display screen 113. This step S75 may be executed after step S74 is completed.

In some other embodiments, in step S74, the plurality of second oscillating points P2 are generated between the oscillation positions of the plurality of first oscillating points P1 and the display screen 113, and the oscillation intensity of the plurality of second oscillating points P2 is different from that of the plurality of first oscillating points P1. For example, when the finger F of the user approaches the display screen 113, the processing unit 104 enhances the oscillation intensity of the plurality of second oscillating points P2, so that the oscillation intensity of the plurality of second oscillating points P2 is greater than that of the plurality of first oscillating points P1. The user may be allowed to feel a haptic sense regarding pressing down the key. Conversely, when the finger F of the user moves away from the display screen 113, the processing unit 104 weakens the oscillation intensity of the plurality of second oscillating points P2, so that the oscillation intensity of the plurality of second oscillating points P2 is less than that of the plurality of first oscillating points P1. The user may be allowed to feel a haptic sense regarding releasing the key.

In some embodiments, in steps S72 to S74, the processing unit 104 may also determine that the user has no intention of further operation based on the displacement distance of the finger F in the rotation process.

In some embodiments, in step S72, the operating motion is the interactive part gradually widening in the rotation direction. At this time, in step S74, the oscillation intensity of the plurality of second oscillating points P2 will gradually decrease in the rotation direction.

By way of example, in step S72, taking the multi-finger operation and the operating motion as the rotation motion as an example, if the distance (absolute distance) between the central points P3 of two finger F (see the central points P3 in FIG. 7a or FIG. 7b) gradually increases in the process of the rotation motion of the two fingers F, it indicates that the user may be releasing the virtual knob. Based on this, in step S74, the oscillation intensity of the plurality of second oscillating points P2 gradually decreases in the rotation direction, so that the finger F of the user may feel the haptic sense of gradually releasing the knob.

In some embodiments, in step S72, the processing unit 104 may also determine whether the user has the intention of further operation or not based on the displacement distance of the finger F in the rotation process (i.e., operating motion).

In some embodiments, in step S72, the operating motion is the interactive part gradually narrowing in the rotation direction. At this time, in step S74, the oscillation intensity of the plurality of second oscillating points P2 will gradually increase in the rotation direction.

By way of example, in step S72, taking the multi-finger operation and the operating motion as the rotation motion as an example, if the distance between the two fingers F of the user gradually decreases in the process of the rotation motion of the two fingers F, it indicates that the user may be pinching the virtual operating part. That is, the distance (absolute distance) between the central points of the two fingers F (see the central points P3 in FIG. 7a or FIG. 7b) gradually decreases, indicating that the haptic sense of the finger F for the second oscillating clump C2 is still not obvious enough, and the user wants to enhance the haptic sense regarding touching an object, or the user has not yet completed the operating motion. Based on this, in step S74, the ultrasonic component 106 may sequentially generate the second oscillating points P2 based on the second control signal in manner of gradually enhancing the oscillation intensity of the plurality of second oscillating points P2 in the rotation direction, so that the finger F of the user may feel the haptic sense of gradually pinching the knob from the second oscillating clump C2.

In some embodiments, in step S74, the rotation direction in which the second oscillating points P2 are generated may be the inward-to-outward rotation direction or the outward-to-inward rotation direction.

In some embodiments, after step S74, the processing unit 104 may also know from the operating motion applied onto the second oscillating clump C2 that the user has completed the operation, that is, the operating motion is the finger F leaving the operating position, and at this time, the ultrasonic component 106 is closed to stop emitting the ultrasonic waves (U1, U2 and U3). Specifically, after step S74, the steps S71 and S72 are returned and executed again, and in step S72, the operating motion obtained by the processing unit 104 is that the operating width of the interactive part is greater than an operating threshold. At this time, the processing unit 104 generates a disable signal to stop the ultrasonic component 106 from generating a plurality of second oscillating points P2, that is, skipping further executing step S73.

By way of example, after the second oscillating clump C2 is generated, when the distance between the central points P3 of the fingers F of the user gradually increases to a value greater than the operating threshold, it indicates that the user wants to stop the operation and moves away from the virtual operating part. Therefore, the processing unit 104 generates and provides the disable signal to the ultrasonic component 106, thereby disabling the ultrasonic component 106. As a result, each finger F can no longer touch the second oscillating clump C2, resulting in a sense of releasing the knob/key.

In some embodiments, the operating threshold may be preset and stored, and includes a key operating threshold or a knob operating threshold. In other words, the operating threshold will correspond to the operating region where the operating position is located, that is, the operating position is located in the first operating region 115 or the second operating region 117. By way of example, when the operating position is located in the key operating region, the operating threshold may be the key operating threshold. When the operating position is located in the knob operating region, the operating threshold may be the knob operating threshold.

In some embodiments, the key operating threshold may refer to being less than or equal to the distance between the operating positions, generated by the plurality of first oscillating points P1, and the display screen 113. For example, it is assumed that the distance between the operating positions, generated by the plurality of first oscillating points P1, and the display screen 113 is 5 cm, and the key operating threshold is 5 cm. After the second oscillating clump C2 is generated, when the finger F moves away from the display screen 113 until the distance between the finger F and the display screen 113 exceeds 5 cm, the processing unit 104 will generate the disable signal, and the ultrasonic component 106 can stop emitting the ultrasonic waves based on the disable signal.

In some embodiments, the knob operating threshold may refer to a predetermined multiple, such as 1.5 times the distance between two fingers F, of the distance between two interactive parts when the interactive parts start to apply the operating motion onto the first oscillating clump C1. By way of example, it is assumed that the distance between the two fingers F when the operating motion starts to be applied onto the first oscillating clump C1 is 5 cm, the operating threshold is correspondingly set to 7.5 cm with 1.5 times of distance. After the second oscillating clump C2 is generated, when the two fingers F gradually move away from each other until the distance between the central points P3 of the two fingers F is greater than 7.5 cm, the processing unit 104 will generate the disable signal, and the ultrasonic component 106 can stop emitting ultrasonic waves based on the disable signal.

Reference is made to FIGS. 1 to 12 together. In some embodiments, step S50 of the method for controlling haptic output further includes: receiving, by the processing unit 104, another detection image through the camera component 102 (step S81), analyzing, by the processing unit 104, the another detection image to obtain an operating motion applied onto the first oscillating clump C1 (step S82), generating, by the processing unit 104, a second control signal corresponding to the operating motion (step S83), and generating, by the ultrasonic component 106, a plurality of second oscillating points P2 forming the second oscillating clump C2 at the operating position in a rotation direction based on the second control signal (step S84 or S85). The plurality of second oscillating points P2 include a central point P3 and a plurality of scattered points P4. The plurality of scattered points P4 are located on the periphery of the central point P3.

In some embodiments, in step S84, the ultrasonic component 106 generates the plurality of scattered points P4 and finally generates the central point P3 in the rotation direction.

In some other embodiments, in step S85, the ultrasonic component 106 firstly generates the central point P3, and subsequently generates the plurality of scattered points P4 sequentially on the periphery of the central point P3 in the rotation direction.

In some embodiments, the rotation direction may be the counterclockwise direction or the clockwise direction.

It should be noted that the execution process of step S81 is similar to those of steps S61 and S71, so reference is made to the descriptions of steps S61 and S71. Step S81 may be executed after step S54 is completed. The execution process of step S82 is similar to those of steps S62 and S72, so reference is made to the descriptions of steps S62 and S72. Steps S63 and S73 are similar to step S83, so reference is made to the descriptions of steps S63 and S73. The execution processes of steps S84 and S85 are similar to that of step S74, so reference is made to the description of step S74.

Figure 12:
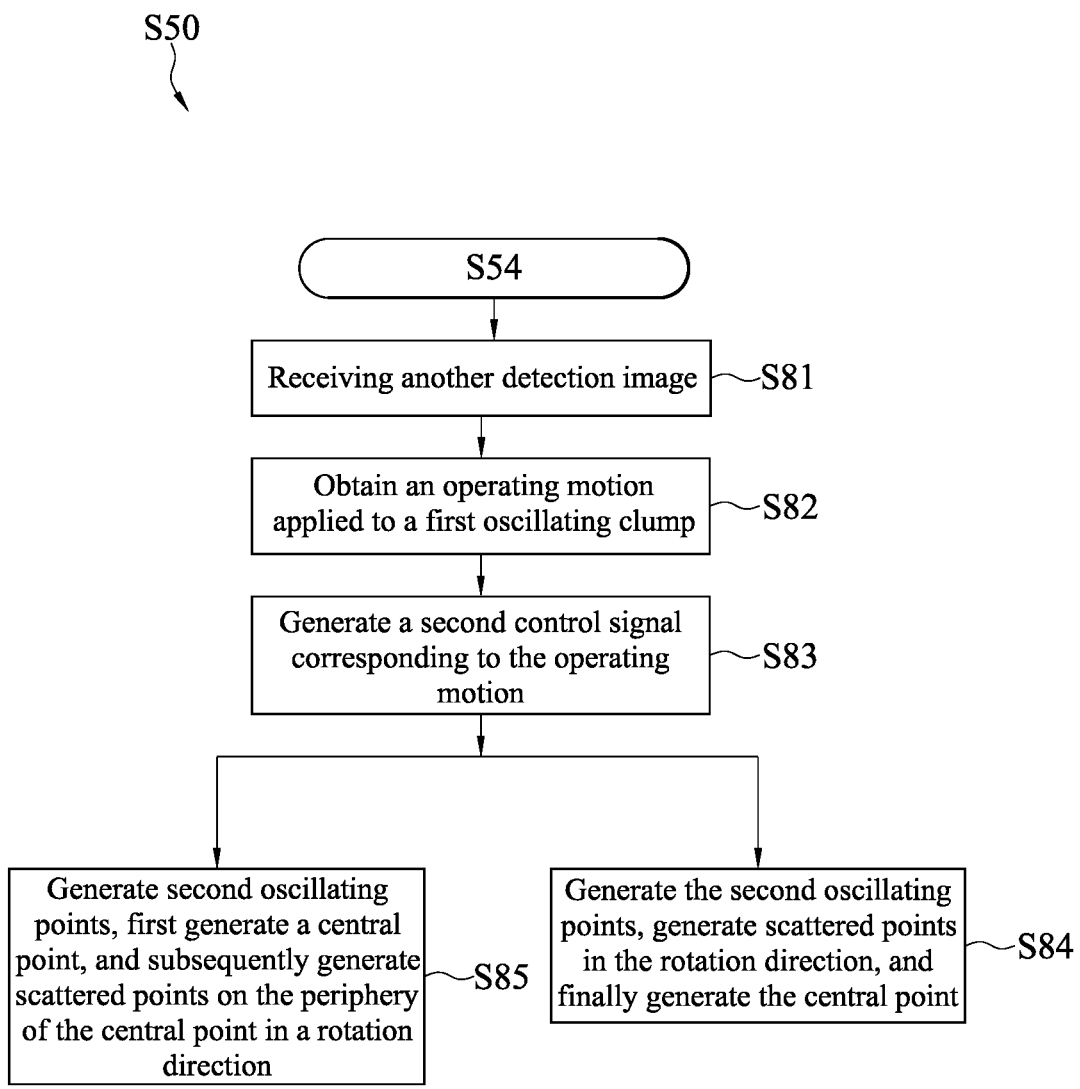
FIG. 12 is a flowchart of a method for controlling haptic output according to some further embodiments.

In some embodiments, as shown in FIG. 12, when step S83 is completed, step S84 or step S85 may be selectively executed.

Figure 13:
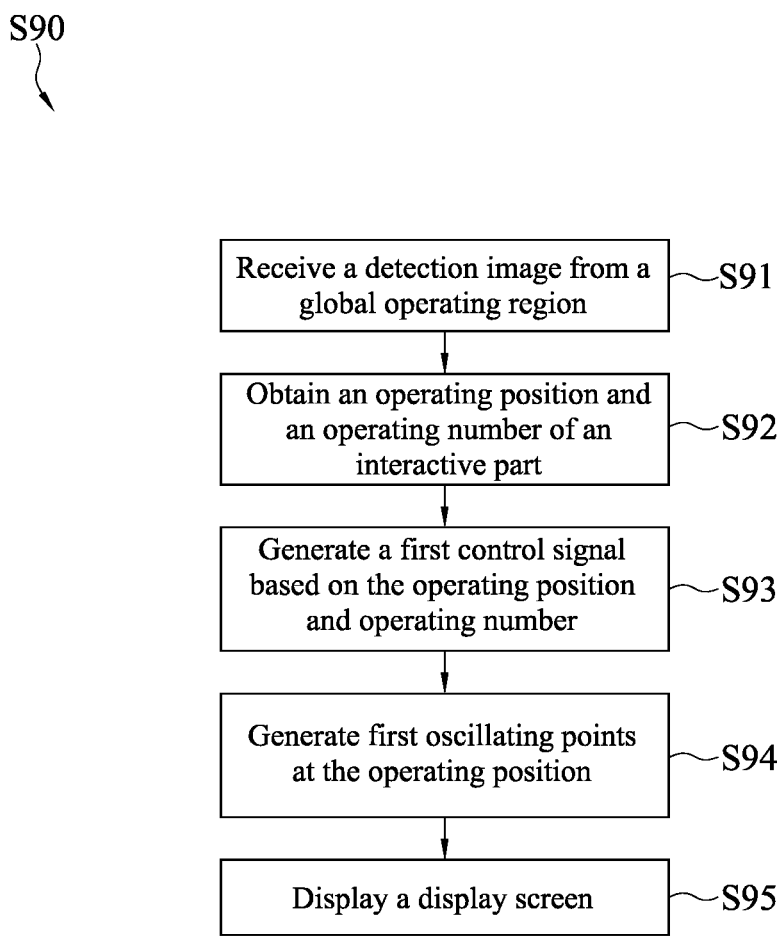
FIG. 13 is a flowchart of a method for controlling haptic output showing generating a first control signal with an operating position and an operating quantity according to some embodiments.

Referring to FIG. 13, in some embodiments, step S90 of the method for controlling haptic output includes: capturing, by the camera component 102, a detection image in a global operating region 119 (step S91), analyzing, by the processing unit 104, the detection image to obtain an operating position and an operating quantity of an interactive part (step S92), generating, by the processing unit 104, a first control signal according to the operating position and the operating quantity (step S93), generating, by the ultrasonic component 106, a plurality of first oscillating points P1 forming a first oscillating clump C1 at the operating position based on the first control signal (step S94), and displaying a display screen 113, where the first oscillating clump C1 is associated with the display screen 113 (step S95).

It should be noted that the execution process of step S94 is similar to that of step S54, so reference is made to the description of step S54. The execution process of step S95 is similar to that of step S55, so reference is made to the description of step S55.

In some embodiments, in step S91, when the interactive part enters a global operating region 119, the camera component 102 may capture a detection image containing the pattern of the interactive part. Reference is made to the description of FIG. 4b for the definition of the global operating region 119.

In some embodiments, in step S92, after the processing unit 104 obtains the detection image, a position where the pattern of the interactive part is located in the detection image may be analyzed to obtain the coordinate position of the interactive part in the three-dimensional space to serve as an operating position with coordinate information. Moreover, the detection image includes the operating quantity of the interactive parts.

In some embodiments, in step S93, the processing unit 104 may generate the first control signal based on the operating position and the operating quantity. In this embodiment, the processing unit 104 may obtain the operating quantity of the interactive parts (such as the quantity of the fingers F) by analyzing the detection image. By way of example, when the user enters the three-dimensional space with two fingers F for manipulation, the processing unit 104 may obtain, based on a case where there are two finger patterns in the detection image, information about the quantity of fingers being "two".

Figure 14:
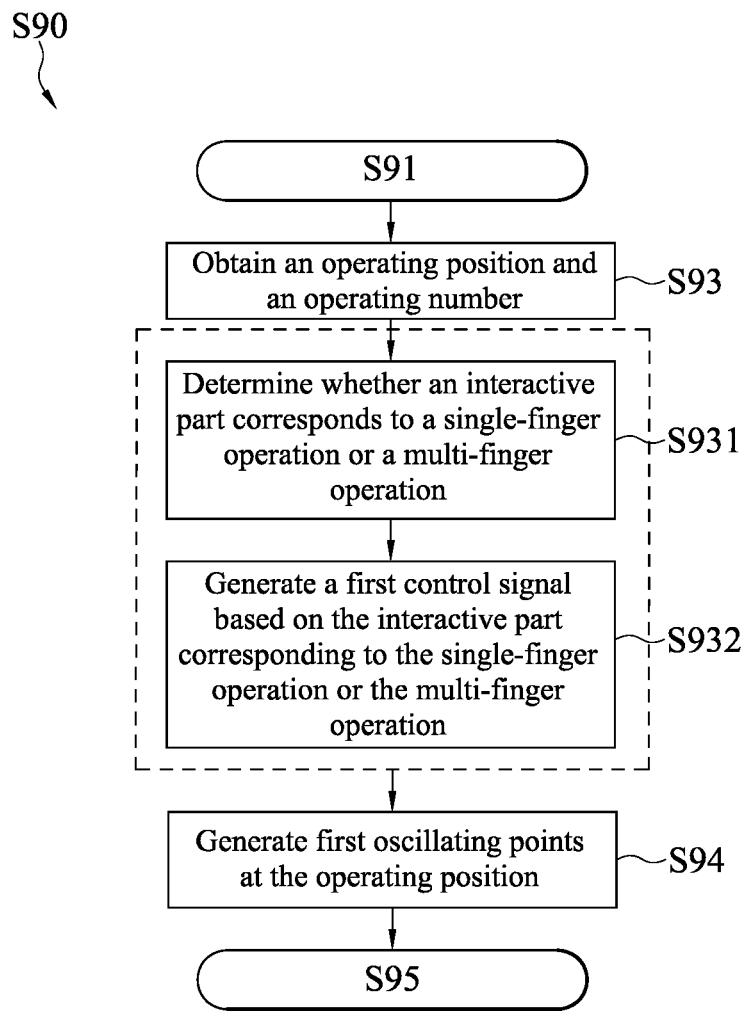
FIG. 14 is a detailed flowchart of an example of step S93 in FIG. 13.

In some embodiments, as shown in FIG. 14, step S93 includes: determining, by the processing unit 104 and based on the operating quantity, whether the interactive part corresponds to a single-finger operation or a multi-finger operation (step S931), and generating, by the processing unit 104, the first control signal based on the interactive part corresponding to the multi-finger operation or the single-finger operation (step S932).

In some embodiments, in step S931, the processing unit 104 determines, based on the operating quantity of the interactive parts, whether the interactive part corresponds to the single-finger operation or the multi-finger operation.

In some embodiments, in step S932, the processing unit 104 may determine, based on the interactive part (finger F) corresponding to one of the multi-finger operation or the single-finger operation, whether the first control signal is generated or not. Conversely, if the interactive part corresponds to the neither multi-finger operation nor the single-finger operation, the processing unit 104 does not generate the first control signal.

In some embodiments, the camera component 102 may be, for example, a time of flight camera or a depth camera.

In some embodiments, the processing unit 104 may be, for example, a central processing unit (CPU), a micro controller, a graphics processing unit (GPU), or any combination thereof.

In some embodiments, the ultrasonic component 106 may be implemented by multiple ultrasonic wave sensors.

In some embodiments, each ultrasonic emission unit 108 may be implemented by an ultrasonic probe. In some embodiments, the controller 110 may be implemented by an ultrasonic transceiver chip.

In some embodiments, the display component 112 may be, for example, a display screen that solely provides a display function, a touch screen that can provide display and input functions, a two-dimensional or three-dimensional projecting device that outputs the display screen 113 in manner of projection, or a television wall formed by splicing multiple screens.

In some embodiments, the peripheral component 114 may be, for example, but not limited to, an audio device, an air conditioning device or a lighting device.

In summary, in some embodiments, an electronic apparatus 10 with haptic output and step S50 of a method for controlling haptic output are applicable to a user interface of an electronic apparatus 10 to provide corresponding oscillating clumps (C1/C2) by quickly scanning the operating position through the oscillating point P1 (or oscillating point P2) to serve as a virtual manipulation interface with a real haptic sense, such as a virtual key or a virtual knob, thereby making the operating experience close to that of a physical object. Moreover, based on the electronic apparatus 10 with haptic output or step S50 of the method for controlling haptic output, the energy of each oscillating point (P1/P2) is reduced, to avoid a sharp haptic sense that is prone to occur when touching the oscillating clump (C1/C2), thereby making the operating experience closer to that of the physical object. In some embodiments, based on the electronic apparatus 10 with haptic output or step S50 of the method for controlling haptic output, the size of the oscillating clump (C1/C2) can be adjusted based on the dimension of the interactive part, thereby making the virtual manipulation interface more in line with human factors engineering. In some embodiments, based on the electronic apparatus 10 with haptic output or step S50 of the method for controlling haptic output, distribution positions, a generation order, oscillation intensity or a combination thereof of the oscillating points (P1/P2) forming the oscillating clump (C1/C2) can be adjusted based on a simple and intuitive operating motion (for example, fingers rotating like turning a knob, or fingers pressing down like pressing a key) of the interactive part, in order to make the virtual manipulation interface more intuitive to use, thereby eliminating the need to recite the complex operating motion.

What is claimed is:

1. An electronic apparatus with haptic output, comprising:
a camera component;
an ultrasonic component; and
a processing unit, coupled to the camera component and the ultrasonic component, wherein the processing unit is configured to:
repeatedly receive a detection image through the camera component,
continuously analyze the detection image to obtain a plurality of operating positions,
respectively generate a first control signal and a second control signal corresponding to two operating positions, which are continuously obtained and different from each other of the plurality of operating positions,
output the first control signal to the ultrasonic component, and sequentially generate a plurality of first oscillating points to form an oscillating clump at former of the two operating positions based on the first control signal through the ultrasonic component,
output the second control signal to the ultrasonic component, and sequentially generate a plurality of second oscillating points to form another oscillating clump at latter of the two operating positions based on the second control signal through the ultrasonic component, wherein
the plurality of second oscillating points have gradually-decreasing or gradually-increasing oscillation intensities in a rotation direction according to a distance change between the two operating positions.

2. The electronic apparatus with haptic output according to claim 1, further comprising:
a display component, coupled to the processing unit, wherein the processing unit is configured to generate a display screen associated with the oscillating clump through the display component.

3. The electronic apparatus with haptic output according to claim 2, wherein the distance change is caused by an operating motion applied onto the oscillating clump, and the processing unit is configured to:
generate the display screen corresponding to the operating motion through the display component.

4. The electronic apparatus with haptic output according to claim 1, wherein
an appearance of the another oscillating clump is different from that of the oscillating clump.

5. The electronic apparatus with haptic output according to claim 1, wherein
the plurality of first oscillating points and the plurality of second oscillating points respectively comprise a central point and a plurality of scattered points, the plurality of scattered points are located on the periphery of the central point, and the plurality of scattered points are generated at different times than the central point.

6. The electronic apparatus with haptic output according to claim 1, wherein the plurality of first oscillating points and the plurality of second oscillating points respectively comprises a central point and a plurality of scattered points, the plurality of scattered points are located on the periphery of the central point, and the ultrasonic component generates the central point and the plurality of scattered points one by one and successively in the rotation direction, wherein each first oscillating point and each second oscillating point refers to a position point of a wave peak with a maximum amplitude from intersecting ultrasonic waves.

7. A method for controlling haptic output, comprising:
repeatedly receiving, by a processing unit, a detection image through a camera component;
continuously analyzing, by the processing unit, the detection image to obtain a plurality of operating positions of a plurality of interactive part;
respectively generating, by the processing unit, a first control signal and a second control signal corresponding to two operating positions, which are continuously obtained and different from each other of the plurality of operating positions;
sequentially generating, by an ultrasonic component, a plurality of first oscillating points to form an oscillating clump at former of the two operating positions based on the first control signal from the processing unit,
sequentially generate, by the ultrasonic component, a plurality of second oscillating points to form another oscillating clump at latter of the two operating positions based on the second control signal from the processing unit, wherein
the plurality of second oscillating points have gradually-decreasing or gradually-increasing oscillation intensities in a rotation direction according to a distance change between the two operating positions.

8. The method for controlling haptic output according to claim 7, further comprising:
displaying a display screen, by a display component, wherein the oscillating clump is associated with the display screen, and the display screen comprises a first operating region and a second operating region;

an operating quantity of the interactive part is also obtained in the step of continuously analyzing the detection image, and in the step of respectively generating the first control signal and the second control signal corresponding to two the operating positions, wherein the step comprises:

determining, by the processing unit, based on the operating position, whether the interactive part is located in the first operating region or located in the second operating region;

determining, by the processing unit, based on the operating quantity, whether the interactive part corresponds to a single-finger operation or belongs to a multi-finger operation;

respectively generating, by the processing unit, the first control signal and the second control signal in response to the interactive part being located in one of the first operating region and second operating region corresponding to the multi-finger operation, or in response to the interactive part being located in other of the first operating region and the second operating region and-corresponding to the single-finger operation.

9. The method for controlling haptic output according to claim 7, wherein the distance change is caused by an operating motion applied onto the oscillating clump, the control method further comprising:

displaying, by a display component, a display screen corresponding to the operating motion, wherein the oscillating clump is associated with the display screen.

10. The method for controlling haptic output according to claim 7, wherein further comprising:

an appearance of the another oscillating clump is different from that of the oscillating clump.

11. The method for controlling haptic output according to claim 7, wherein the distance change is caused by an operating motion applied onto the oscillating clump, the operating motion is the interactive part gradually widening in the rotation direction, and in the step of sequentially generate the plurality of second oscillating points to form another oscillating clump at latter of the two operating positions based on the second control signal from the processing unit, the oscillation intensity of the plurality of second oscillating points gradually decreases in the rotation direction.

12. The method for controlling haptic output according to claim 11, wherein after the step of sequentially generate the plurality of second oscillating points to form another oscillating clump at latter of the two operating positions based on the second control signal from the processing unit, the control method further comprises:

generating a disable signal to stop generation of the plurality of second oscillating points in response to an operating width of the interactive part is greater than an operating threshold.

13. The method for controlling haptic output according to claim 7, wherein the distance change is caused by an operating motion applied onto the oscillating clump, the operating motion is the interactive part gradually narrowing in the rotation direction, and in the step of sequentially generate the plurality of second oscillating points to form another oscillating clump at latter of the two operating positions based on the second control signal from the processing unit, the oscillation intensity of the plurality of second oscillating points gradually increases in the rotation direction.

14. The method for controlling haptic output according to claim 7, wherein the distance change is caused by an operating motion applied onto the oscillating clump, and the plurality of second oscillating points comprise a central point and a plurality of scattered points, the plurality of scattered points are located on the periphery of the central point, and the step of sequentially generate the plurality of second oscillating points to form another oscillating clump at latter of the two operating positions based on the second control signal from the processing unit, is to firstly and sequentially generate the plurality of scattered points, and finally generate the central point among the plurality of scattered points in the rotation direction from outward to inward.

15. The method for controlling haptic output according to claim 7, wherein the distance change is caused by an operating motion applied onto the oscillating clump, and the plurality of second oscillating points comprise a central point and a plurality of scattered points, the plurality of scattered points are located on the periphery of the central point, and the step of sequentially generate the plurality of second oscillating points to form another oscillating clump at latter of the two operating positions based on the second control signal from the processing unit, is to firstly generate the central point, and subsequently and sequentially generate the plurality of scattered points on the periphery of the central point in the rotation direction from inward to outward.

16. The method for controlling haptic output according to claim 7, wherein the plurality of first oscillating points comprises a central point and a plurality of scattered points, the central point is located at the center of the operating position, the plurality of scattered points are located on the periphery of the central point, an oscillation range of the central point locally overlaps with that of the plurality of scattered points, and the step of sequentially generate the plurality of second oscillating points to form another oscillating clump at latter of the two operating positions based on the second control signal from the processing unit, comprises:

generating the central point and the plurality of scattered points one by one and successively in the rotation direction.

17. A method for controlling haptic output, comprising:

repeatedly capturing a detection image;

continuously analyzing, by a processing unit, the detection image to obtain a plurality of operating positions and an operating quantity of a plurality of interactive part;

respectively generating, by the processing unit, a first control signal and a second control signal corresponding to two operating positions, which are continuously obtained and different from each other of the plurality of operating positions and the operating quantity;

sequentially generating, by an ultrasonic component, a plurality of first oscillating points to form an oscillating clump at former of the two operating positions based on the first control signal from the processing unit;

sequentially generate, by the processing unit, a plurality of second oscillating points to form another oscillating clump at latter of the two operating positions based on the second control signal from the processing unit, wherein the plurality of second oscillating points have gradually-decreasing or gradually-increasing oscillation intensities in a rotation direction according to a distance change between the two operating positions, and displaying a display screen, wherein the oscillating clump is associated with the display screen.

18. The method for controlling haptic output according to claim 17, wherein the display screen comprises a global operating region, and the step of respectively generating, the first control signal and the second control signal corresponding to two operating positions comprises:
- determining, based on the operating quantity, whether the interactive part corresponds to a single-finger operation or a multi-finger operation; and
- sequentially generating, by the processing unit, the first control signal and the second control signal based on the interactive part corresponding to the multi-finger operation or the single-finger operation, wherein
- each first oscillating point and each second oscillating point refers to a position point of a wave peak with a maximum amplitude from intersecting ultrasonic waves.

* * * * *